(12) United States Patent
Shrivastava et al.

(10) Patent No.: US 11,736,906 B2
(45) Date of Patent: Aug. 22, 2023

(54) METHOD AND SYSTEM FOR MBS SWITCHING AND CONTINUITY IN 5G WIRELESS NETWORK

(71) Applicant: SAMSUNG ELECTRONICS CO., LTD., Suwon-si (KR)

(72) Inventors: Vinay Kumar Shrivastava, Bangalore (IN); Neha Agarwal, Bangalore (IN); Rohan Raj, Bangalore (IN); Arun Raj Rajendran, Bangalore (IN); Avijit Manna, Bangalore (IN); Fasil Abdul Latheef, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/395,930

(22) Filed: Aug. 6, 2021

(65) Prior Publication Data
US 2022/0046389 A1 Feb. 10, 2022

(30) Foreign Application Priority Data

Aug. 6, 2020 (IN) .............................. 202041033700
Aug. 2, 2021 (IN) .............................. 202041033700

(51) Int. Cl.
*H04W 4/06* (2009.01)
*H04L 1/00* (2006.01)
*H04W 80/02* (2009.01)
*H04L 5/00* (2006.01)
*H04W 72/121* (2023.01)
*H04W 72/1263* (2023.01)

(52) U.S. Cl.
CPC ............. *H04W 4/06* (2013.01); *H04L 1/0025* (2013.01); *H04W 72/121* (2013.01); *H04W 72/1263* (2013.01); *H04W 80/02* (2013.01)

(58) Field of Classification Search
CPC . H04W 4/06; H04W 72/121; H04W 72/1263; H04W 80/02; H04W 72/1289; H04W 72/005; H04L 1/0025; H04L 5/001; H04L 5/0064; H04L 5/0098
See application file for complete search history.

(56) References Cited

U.S. PATENT DOCUMENTS

| | | | |
|---|---|---|---|
| 8,798,657 B2 * | 8/2014 | Wang .................... | H04W 72/23 455/511 |
| 2003/0157966 A1 * | 8/2003 | Sato ...................... | H04W 72/30 455/561 |

(Continued)

FOREIGN PATENT DOCUMENTS

WO WO-2021162315 A1 * 8/2021

*Primary Examiner* — Harry H Kim
(74) *Attorney, Agent, or Firm* — F. Chau & Associates, LLC

(57) ABSTRACT

Embodiments herein disclose a method for MBS switching and continuity in a 5G wireless network. The method includes establishing, by a gNodeB, a MBS session with a UE. Further, the method includes providing, by the gNodeB, MBS to the UE during the MBS session. Further, the method includes detecting, by the gNodeB, that the at least one MBS is going to get suspended or deactivated. Further, the method includes sending, by the gNodeB, an indication to the UE indicating the at least one MBS going to get suspended or deactivated prior to suspension or deactivation of the at least one MBS at the UE.

18 Claims, 18 Drawing Sheets

(56) References Cited

U.S. PATENT DOCUMENTS

| | | | | |
|---|---|---|---|---|
| 2012/0093126 | A1* | 4/2012 | Wu | H04W 12/06 370/328 |
| 2014/0362713 | A1* | 12/2014 | Agarwal | H04W 24/08 370/332 |
| 2015/0043476 | A1* | 2/2015 | Takeda | H04L 5/0051 370/329 |
| 2019/0380078 | A1* | 12/2019 | Fujishiro | H04W 4/06 |

* cited by examiner

METHOD AND SYSTEM FOR MBS SWITCHING AND CONTINUITY IN 5G WIRELESS NETWORK

CROSS-REFERENCE TO RELATED APPLICATIONS

The present application claims priority under 35 U.S.C. § 119 to Indian Provisional Patent Application No. 202041033700, filed on Aug. 6, 2020, and Indian Patent Application No. 202041033700, filed on Aug. 2, 2021, the entire contents of which are herein incorporated by reference.

FIELD OF INVENTION

The present disclosure relates to a wireless communication network, and more specifically related to a method and a system for multicast service switching, mobility and service continuity in a fifth generation (5G) wireless communication network.

DISCUSSION OF THE RELATED ART

In general, multicast/broadcast services are provided in wireless systems like long term evolution (LTE) through Multicast Broadcast Single Frequency Network (MBSFN) which is a multi-cell transmission technique or a Single Cell Point to Multipoint (SCPTM) which is single cell technique. There are control channels, such as a MBS Control Channel (MCCH) to carry control/signaling information for multicast/broadcast service configuration purpose and data channels, MTCH (MBS Traffic Channel) to carry the actual traffic for multicast/broadcast services. There is a periodic transmission of MCCH channel and in LTE MBSFN, Multicast/broadcast service mapped to MTCH will follow a scheduling pattern. The scheduling information is provided through a MSI (MBMS Scheduling Information) MAC CE in a LTE MBSFN whereas for SCPTM transmission, scheduling is done per a transmission time interval (TTI) and multicast services on a PDSCH (Physical Downlink Shared Channel) are scheduled through a PDCCH (Physical Downlink Control Channel) with their respective G-RNTI (Group Radio Network Terminal Identifier). There is one to one mapping between a G-RNTI and a specific multicast/broadcast service.

While receiving multicast/broadcast services, there may be a need to switch service delivery mode from multicast (PTM, Point to Multipoint) to unicast (PTP, Point to Point) or vice-versa and/or when user equipment (UE) is performing mobility across cells, there is a need to ensure service continuity. Overall, in order to ensure user satisfaction, there should be seamless transition across cells and no perceptible interruption to the users in terms of service reception.

Thus, it is desired to address the above mentioned disadvantages or other shortcomings or at least provide a useful alternative.

SUMMARY

Accordingly, embodiments herein disclose a method for MBS switching and continuity in a 5G wireless network. The method includes establishing, by a gNodeB, a MBS session with a UE. Further, the method includes providing, by the gNodeB, MBS to the UE during the MBS session. Further, the method includes detecting, by the gNodeB, that the MBS is going to get suspended or deactivated. Further, the method includes sending, by the gNodeB, an indication to the UE indicating the MBS going to get suspended or deactivated prior to suspension or deactivation of the MBS at the UE.

In an embodiment, the indication is at least one of a MAC control element (CE), a radio resource control (RRC) signalling, and a Downlink control information (DCI).

In an embodiment, the MAC CE includes a Group Radio Network Temporary Identifier (G-RNTI), a Logical Channel ID (LCID) information, identifier of the MBS session and a Temporary Mobile Group Identifier (TMGI).

In an embodiment, the method further includes detecting, by the gNodeB, that the at least one MBS is received using a first delivery mode. Further, the method includes sending, by the gNodeB, a RRC connection reconfiguration message comprising a bearer configuration for a second delivery mode to the UE to switch from the first delivery mode to the second delivery mode for reception of the at least one MBS. Further, the method includes receiving by the gNodeB, a RRC reconfiguration complete message from the UE.

In an embodiment, the bearer configuration is one of a PTP bearer configuration, a PTM bearer configuration and a split MBS bearer configuration.

In an embodiment, the RRC connection reconfiguration message includes a timer or a transition configuration (e.g. a time period) to switch from the first delivery mode to the second delivery mode for reception of the at least one MBS. Further duplicate reception can happen from both first and second delivery mode during transition.

Accordingly, embodiments herein disclose a method for MBS switching and continuity in a 5G wireless network. The method includes establishing, by a UE, a MBS session with a gNodeB. Further, the method includes receiving, by the UE, the at least one MBS from the gNodeB during the MBS session using a first delivery mode. Further, the method includes receiving, by the UE, an indication from the gNodeB indicating that the at least one MBS going to get suspended or deactivated prior to suspension or deactivation of the at least one MBS at the UE. Further, the method includes switching, by the UE, from the first delivery mode to a second delivery mode to continue reception of the at least one MBS based on a MAC CE prior to suspension or deactivation of the at least one MBS at the UE.

In an embodiment, switching, by the UE, from the first delivery mode to the second delivery mode to continue reception of the at least one MBS based on the MAC CE includes receiving, by the UE, a RRC connection reconfiguration message includes a bearer configuration for the second delivery mode from the gNodeB, and switching, by the UE, from the first delivery mode to the second delivery mode by duplicating reception in the first delivery mode and the second delivery mode for a transition configuration (e.g. a time period) or a timer based on the bearer configuration, and sending by the UE, a RRC reconfiguration complete message to the gNodeB.

Accordingly, embodiments herein disclose a gNodeB for MBS switching and continuity in a 5G wireless network. The gNodeB includes a MBS switching and continuity controller communicatively coupled to a memory and a processor. The MBS switching and continuity controller is configured to establish a MBS session with a UE. Further, the MBS switching and continuity controller is configured to provide at least one MBS to the UE during the MBS session. The MBS switching and continuity controller is configured to detect that the at least one MBS is going to get suspended or deactivated and send an indication to the UE indicating the at least one MBS going to get suspended or deactivated prior to suspension or deactivation of the at least one MBS at the UE.

Accordingly, embodiments herein disclose a UE for MBS switching and continuity in a 5G wireless network. The UE includes a MBS switching and continuity controller communicatively coupled to a memory and a processor. The MBS switching and continuity controller is configured to establish a MBS session with a gNodeB and receive the at least one MBS from the gNodeB during the MBS session using a first delivery mode. Further, the MBS switching and continuity controller is configured to receive an indication from the gNodeB indicating that the at least one MBS going to get suspended or deactivated prior to suspension or deactivation of the at least one MBS at the UE. Further, the MBS switching and continuity controller is configured to switch from the first delivery mode to a second delivery mode to continue reception of the at least one MBS based on the one of MAC CE a radio resource control (RRC) signalling, and a Downlink control information (DCI) prior to suspension or deactivation of the at least one MBS at the UE.

Accordingly, embodiments herein disclose a method for MBS switching and continuity in a 5G wireless network. The method includes establishing, by a gNodeB, a MBS session with a UE for reception of a high priority MBS. Further, the method includes receiving, by the gNodeB, a service migration request from the UE. The service migration request includes a service migration identifier information comprising a priority service identifier of the high priority MBS. Further, the method includes determining, by the gNodeB, at least one of change a Bandwidth Part (BWP) configuration for the UE, a Bearer Type Change (BTC) configuration for reception of the MBS at the UE, deactivate lower priority MBS at the UE in response to receiving the service migration request. Further, the method includes transmitting, by the gNodeB, a service migration response to the UE for service migration. The service migration response includes at least one of: an updated BWP configuration in response to determining by the gNodeB to change the BWP configuration for the UE, an updated bearer configuration in response to determining by the gNodeB to the BTC for the UE, and at least one of a G-RNTI or G-CS-RNTI of lower priority MBS, a LCD information of lower priority MBS, an identifier of the MBS session and a TMGI for service deactivation in response to determining by the gNodeB to deactivate lower priority MBS at the UE.

In an embodiment, the service migration request is received in one of a MBS interest indication message and a UE assistant information.

In an embodiment, the service migration response is sent in one of a RRC connection reconfiguration message and a MAC CE.

Accordingly, embodiments herein disclose a method for MBS switching and continuity in a 5G wireless network. The method includes establishing, by a UE, a MBS session with a gNodeB for reception of a high priority MBS. Further, the method includes detecting, by the UE, a limited capability at the UE for reception of the high priority MBS based on at least one of an BWP configuration, a resource processing, and a number of concurrent services reception at the UE. Further, the method includes sending, by the UE, a service migration request to the gNodeB, wherein the service migration request comprises a service migration identifier information comprising a priority service identifier of the high priority MBS. Further, the method includes receiving, by the UE, a service migration response from the gNodeB for service migration, wherein the service migration response comprises one of: an updated BWP configuration, an updated bearer configuration, and at least one of a G-RNTI or G-CS-RNTI of lower priority MBS, a LCD information of lower priority MBS, an identifier of the MBS session or TMGI to deactivate lower priority MBS at the UE. Further, the method includes continuing, by the UE, reception of the high priority service based on the service migration response.

Accordingly, embodiments herein disclose a gNodeB for MBS switching and continuity in a 5G wireless network. The gNodeB includes a MBS switching and continuity controller communicatively coupled to a memory and a processor. The MBS switching and continuity controller is configured to establish a MBS session with a UE for reception of a high priority MBS. Further, the MBS switching and continuity controller is configured to receive a service migration request from the UE. The service migration request includes a service migration identifier information comprising a priority service identifier of the high priority MBS. Further, the MBS switching and continuity controller is configured to determine at least one of change a BWP configuration for the UE, a BTC for reception of the MBS at the UE, deactivate lower priority MBS at the UE in response to receiving the service migration request. Further, the MBS switching and continuity controller is configured to transmit a service migration response to the UE for service migration. The service migration response includes an updated BWP configuration in response to determining by the gNodeB to change the BWP configuration for the UE, an updated bearer configuration in response to determining by the gNodeB to the BTC for the UE, and at least one of a Group Radio Network Temporary Identifier (G-RNTI) or a Group-Configured Scheduling-Radio Network Identifier (G-CS-RNTI), of lower priority MBS, a Logical Channel ID (LCD) information of lower priority MBS, an identifier of the MBS session or Temporary Mobile Group Identifier (TMGI) for service deactivation in response to determining by the gNodeB to deactivate lower priority MBS at the UE.

Accordingly, embodiments herein disclose a UE for MBS switching and continuity in a 5G wireless network. The UE includes a MBS switching and continuity controller communicatively coupled to a memory and a processor. The MBS switching and continuity controller is configured to establish a MBS session with a gNodeB for reception of a high priority MBS. Further, the MBS switching and continuity controller is configured to detect a limited capability at the UE for reception of the high priority MBS based on at least one of an BWP configuration, a resource processing, and a number of concurrent services reception at the UE. Further, the MBS switching and continuity controller is configured to send a service migration request to the gNodeB, wherein the service migration request comprises a service migration identifier information comprising a priority service identifier of the high priority MBS. Further, the MBS switching and continuity controller is configured to receive a service migration response from the gNodeB for service migration, wherein the service migration response comprises one of an updated BWP configuration, an updated bearer configuration, and at least one of a G-RNTI or G-CS-RNTI of lower priority MBS, a LCID information of lower priority MBS, an identifier of the MBS session or TMGI to deactivate lower priority MBS at the UE. Further, the MBS switching and continuity controller is configured to continue reception of the high priority service based on the service migration response.

Accordingly, embodiments herein disclose a method for MBS switching and continuity in a 5G wireless network.

The method includes establishing, by a UE, a MBS session with a gNodeB for reception of at least one MBS in a first delivery mode. Further, the method includes measuring, by the UE, at least one of a signal strength and a channel quality on a PDSCH or group-common PDSCH channel carrying MBS. Further, the method includes detecting, by the UE, that the at least one of the signal strength and the channel quality reached a configured threshold. Further, the method includes sending, by the UE, one of a MBS interest indication message and a UE assistance information message comprising a delivery mode change to a second delivery mode to the gNodeB. Further, the method includes receiving, by the UE, a RRC connection reconfiguration message from the UE, wherein the RRC connection reconfiguration message comprising a bearer configuration for receiving the at least one MBS in the second delivery mode. Further, the method includes configuring, by the UE, the bearer configuration for receiving the at least one MBS in the second delivery mode. Further, the method includes sending, by the UE, a RRC connection reconfiguration complete message to the gNodeB.

In an embodiment, measuring at least one of the signal strength and the channel quality on the PDSCH or group-common PDSCH channel carrying the MBS comprises measuring a CSI-RS based RSRP, a SINR, a CQI, a CSI on the PDSCH or group-common PDSCH channel.

Accordingly, embodiments herein disclose a method for MBS switching and continuity in a 5G wireless network. The method includes establishing, by a gNodeB, a MBS session with a UE for reception of at least one MBS in a first delivery mode. Further, the method includes receiving, by the gNodeB, one of a MBS interest indication message and a UE assistance information message comprising a delivery mode change to a second delivery mode from the UE. Further, the method includes sending, by the gNodeB, a RRC connection reconfiguration message to the UE. The RRC connection reconfiguration message includes a bearer configuration for receiving the at least one MBS in the second delivery mode. Further, the method includes receiving, by the gNodeB, a RRC connection reconfiguration complete message from the UE.

In an embodiment, further, the method includes configuring, by the gNodeB, a threshold for a signal strength and a channel quality at the UE to receive one of the MBS interest indication message and the UE assistance information message from the UE.

Accordingly, embodiments herein disclose a UE for MBS switching and continuity in a 5G wireless network. The UE includes a MBS switching and continuity controller communicatively coupled to a memory and a processor. The MBS switching and continuity controller is configured to establish a MBS session with a gNodeB for reception of at least one MBS in a first delivery mode. The MBS switching and continuity controller is configured to measure at least one of a signal strength and a channel quality on a PDSCH or group-common PDSCH channel carrying MBS. The MBS switching and continuity controller is configured to detect that at least one of the strength and the channel quality reached a configured threshold. The MBS switching and continuity controller is configured to send one of a MBS interest indication message and a UE assistance information message comprising a delivery mode change to a second delivery mode to the gNodeB. The MBS switching and continuity controller is configured to receive a RRC connection reconfiguration message from the UE, wherein the RRC connection reconfiguration message comprising a bearer configuration for receiving the at least one MBS in the second delivery mode. The MBS switching and continuity controller is configured to configure the bearer configuration for receiving the at least one MBS in the second delivery mode. The MBS switching and continuity controller is configured to send a RRC connection reconfiguration complete message to the gNodeB.

Accordingly, embodiments herein disclose a gNodeB for MBS switching and continuity in a 5G wireless network. The gNodeB includes a MBS switching and continuity controller communicatively coupled to a memory and a processor. The MBS switching and continuity controller is configured to establish a MBS session with a UE for reception of at least one MBS in a first delivery mode. Further, the MBS switching and continuity controller is configured to receive one of a MBS interest indication message and a UE assistance information message comprising a delivery mode change to a second delivery mode from the UE. Further, the MBS switching and continuity controller is configured to send a RRC connection reconfiguration message to the UE, wherein the RRC connection reconfiguration message comprising a bearer configuration for receiving the at least one MBS in the second delivery mode. Further, the MBS switching and continuity controller is configured to receive a RRC connection reconfiguration complete message from the UE.

Accordingly, embodiments herein disclose a method for MBS switching and continuity in a 5G wireless network. The method includes establishing, by a UE, a MBS session with a source gNodeB for reception of at least one MBS. Further, the method includes sending, by the UE, one of a MBS interest Indication to the source gNodeB to handover from the source gNodeB to a target gNodeB from a plurality of target gNodeBs. Further, the method includes receiving, by the UE, a RRC connection reconfiguration message from the source gNodeB. The RRC connection reconfiguration message includes the target gNodeB information, measurements and execution conditions for the target gNodeB, and a MBS configuration on the target gNodeB for the at least one MBS including bearer configuration, DRX configuration, G-RNTI, G-CS-RNTI, delivery mode, security context keys and other information. Further, the method includes performing, by the UE, a handover from the source gNodeB to the target gNodeB based on the execution condition met for at least one of target gNodeB received in the RRC connection reconfiguration message and fulfilling at least one interested MBS support. Further, the method includes sending, by the UE, a RRC connection reconfiguration complete message to the target gNodeB.

In an embodiment, further, the method includes performing, by the UE, measurements and determining the execution conditions met for the target gNodeB and fulfilling at least one interested MB S support.

Accordingly, embodiments herein disclose a method for MBS switching and continuity in a 5G wireless network. The method includes establishing, by a source gNodeB, a MBS session with a UE for reception of at least one MBS. Further, the method includes receiving, by the source gNodeB, a MBS interest Indication from the UE to handover from the source gNodeB to a target gNodeB from a plurality of target gNodeBs. Further, the method includes sending, by the source gNodeB, the MBS interest Indication to at least one target gNodeB from the plurality of target gNodeBs. Further, the method includes receiving, by the source gNodeB, a RRC connection reconfiguration message from the at least one target gNodeB, wherein the RRC connection reconfiguration message comprises the target gNodeB information, measurements and execution conditions for the at least one target gNodeb and a MBS configuration on the target gNodeB for the at least one MBS including bearer configuration, DRX configuration, G-RNTI, G-CS-RNTI, delivery mode, security context keys and other information. Further, the method includes sending, by the source gNodeB, the RRC connection reconfiguration message to the UE to perform the handover to at least one of the target gNodeB from the plurality of target gNodeBs.

Accordingly, embodiments herein disclose a UE for MBS switching and continuity in a 5G wireless network. The UE includes a MBS switching and continuity controller communicatively coupled to a memory and a processor. The MBS switching and continuity controller is configured to establish a MBS session with a source gNodeB for reception of at least one MBS. The MBS switching and continuity controller is configured to send a MBS interest Indication to the source gNodeB to handover from the source gNodeB to a target gNodeB from a plurality of target gNodeBs. The MBS switching and continuity controller is configured to receive a RRC connection reconfiguration message from the source gNodeB, wherein the RRC connection reconfiguration message comprises the target gNodeB information, measurements and execution conditions for the target gNodeB, and a MBS configuration on the target gNodeB for the at least one MBS. The MBS switching and continuity controller is configured to perform measurements and determine the execution conditions met for at least one of the target gNodeB and fulfilling at least one interested MBS support. The MBS switching and continuity controller is configured to perform a handover from the source gNodeB to the target gNodeB based on the RRC connection reconfiguration message. The MBS switching and continuity controller is configured to send a RRC connection reconfiguration complete message to the target gNodeB.

Accordingly, embodiments herein disclose a gNodeB for MBS switching and continuity in a 5G wireless network. The gNodeB includes a MBS switching and continuity controller communicatively coupled to a memory and a processor. The MBS switching and continuity controller is configured to establish a MBS session with a UE for reception of at least one MBS. Further, the MBS switching and continuity controller is configured to receive a MBS interest Indication from the UE to handover from the source gNodeB to a target gNodeB from a plurality of target gNodeBs. The MBS switching and continuity controller is configured to send the MBS interest Indication to at least one target gNodeB from the plurality of target gNodeBs. The MBS switching and continuity controller is configured to receive a RRC connection reconfiguration message from the at least one target gNodeB, wherein the RRC connection reconfiguration message comprises the target gNodeB information, measurements and execution conditions for the at least one target gNodeB and a MBS configuration on the at least one target gNodeB for the at least one MBS including bearer configuration, DRX configuration, G-RNTI, G-CS-RNTI, delivery mode, security context keys and other information. The MBS switching and continuity controller is configured to send the RRC connection reconfiguration message to the UE to perform the handover to at least one target gNodeB from the plurality of target gNodeBs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

The embodiments are illustrated in the accompanying drawings, throughout which like reference letters indicate corresponding parts in the various figures. The embodiments herein will be better understood from the following description with reference to the drawings, in which.

DETAILED DESCRIPTION OF DRAWINGS

Figure 1:
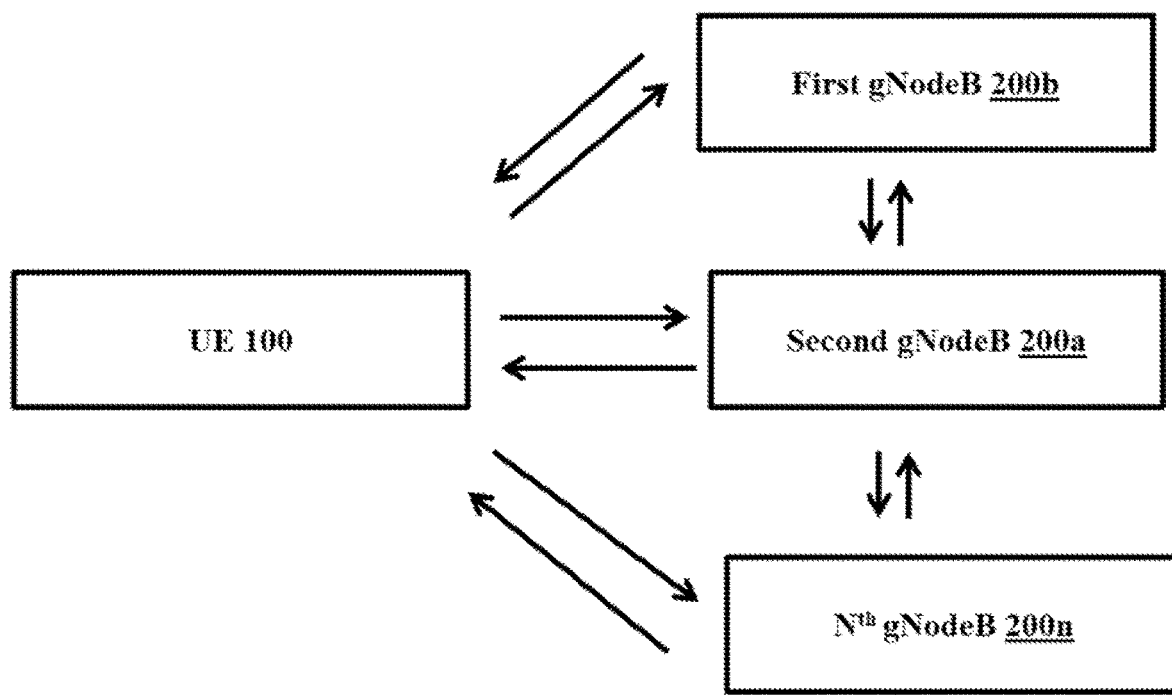
FIG. 1 is an overview of a 5G wireless network for handling a MBS switching and continuity procedure, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The principal object of the embodiments herein is to provide a method and system for multicast service switching, mobility and service continuity in fifth generation (5G) wireless network.

Another object of the embodiments herein is to provide seamless/uninterrupted service delivery in case of dynamically switching between the multicast and the unicast delivery mode or in a mobility scenario.

Another object of the embodiments herein is to provide a MBS switching and continuity in a 5G wireless network in a handover scenario.

Another object of the embodiments herein is to provide the MBS switching and continuity in the 5G wireless network when a gNodeB detects that a MBS is going to get suspended or deactivated.

Another object of the embodiments herein is to provide the MBS switching and continuity in the 5G wireless network, when the gNodeB receives a service migration request from a UE.

Another object of the embodiments herein is to provide the MBS switching and continuity in the 5G wireless network when the UE detects that a signal strength and the channel quality are reached to a configured threshold.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for MBS switching and continuity in a 5G wireless network. The method includes establishing, by a gNodeB, a MBS session with a UE. Further, the method includes providing, by the gNodeB, MBS to the UE during the MBS session. Further, the method includes detecting, by the gNodeB, that the MBS is going to get suspended or deactivated. Further, the method includes sending, by the gNodeB, an indication to the UE indicating the MBS going to get suspended or deactivated prior to suspension or deactivation of the MBS at the UE.

Unlike conventional methods, the proposed method can be used to provide a multicast service switching, mobility and service continuity in the 5G wireless network in an effective manner. The proposed method can be used to provide seamless/uninterrupted service delivery in case of dynamically switching between the multicast and the unicast delivery mode or in mobility scenario. Further, the proposed method includes pre-intimation for service continuation through the MAC CE in a PTM mode, make-before-break approach for service suspension, UE assisted service switching mode along with UE initiated and Network Initiated method, approaches for handling priority and critical services in PTM mode and neighbor cell information (e.g., Cell Id, EARFCN, G-RNTI, G-CS-RNTI, PTM Bearer configuration) reception along with supported Multicast service will help UE in mobility for service continuity.

Referring now to the drawings, and more particularly to FIGS. 1 through 20, there are shown preferred embodiments.

FIG. 1 is an overview of a wireless network (1000) for handling a MBS switching and continuity procedure, according to an embodiment as disclosed herein. In an embodiment, the wireless network (1000) includes a UE (100) and one or more gNodeB (200a-200n). Hereafter the label of the gNodeB is 200. The UE (100) can be, for example, but not limited to a laptop, a desktop computer, a notebook, a relay device, a Device-to-Device (D2D) device, a vehicle to everything (V2X) device, a smartphone, a tablet, an immersive device or the like.

In an embodiment, the gNodeB (200) is configured to establish a MBS session with the UE (100) and provide the MBS to the UE (100) during the MBS session. Further, the gNodeB (200) is configured to detect that the MBS is going to get suspended or deactivated. Based on the detection, the gNodeB (200) is configured to send an indication to the UE (100) indicating the MBS going to get suspended or deactivated prior to suspension or deactivation of the MBS at the UE (100). The indication can be, for example, but not limited to a MAC CE, a RRC signaling, and a DCI. Further, the MAC CE can be, for example, but not limited to a G-RNTI, G-CS-RNTI, a LCD information, identifier of the MBS session and a TMGI.

Further, the gNodeB (200) is configured to detect that the MBS is received using a first delivery mode. Based on the detection, the gNodeB (200) is configured to send a RRC connection reconfiguration message including a bearer configuration for a second delivery mode to the UE (100) to switch from the first delivery mode to the second delivery mode for reception of the MBS. The bearer configuration can be a PTP bearer configuration, a PTM bearer configuration and a split MBS bearer configuration. The RRC connection reconfiguration message includes a timer or a transition configuration (e.g. a time period) to switch from the first delivery mode to the second delivery mode for reception of the MBS. Further, transition time configuration can be used for duplicate reception in both first delivery more and second delivery mode Further, the gNodeB (200) is configured to receive a RRC reconfiguration complete message from the UE (100).

In an example, the UE (100) receiving MBS service in multicast (or unicast) e.g. PTM, PTP etc. mode may encounter a situation where it is not possible to continue receiving the service from same delivery mode. There could be multiple reasons for this to happen e.g. the UE (100) moves out of multicast coverage, network discontinues the specific delivery mode for service based on change in user's density or demand or hitting a congestion situation etc. In such scenarios, there is a need for change of delivery mode so that user of the UE (100) can continue receiving service. The UE (100) can stop receiving service from the multicast mode as the UE (100) moves out of coverage and then starts receiving service in unicast mode (Break-Before-Make). However, this causes interruption in service reception. To enable seamless service continuity, the UE (100) may need to simultaneously receive data from both multicast and unicast channels (Make-Before-Break) temporarily and duplicate reception and discard approach can be employed. Similar service switching from unicast to multicast mode is possible.

Make-before-break approach is preferred to enable seamless service continuity between PTM to PTP. In order to enable Make-Before-Break service switching, Extended MBMS Scheduling Information (E-MSI) MAC Control Element (CE) was used in the LTE MBMS to provide pre-intimation of service suspension from multicast mode. This is shared at MSI occasions repeatedly before actual MCCH update in next modification period. One of the drawback of the E-MSI was its bulky structure which has LCIDs (Logical Channel Identifiers) repeated after the regular LCIDs of a normal MSI to indicate suspension of services. As in NR, there is no backward compatibility issue, therefore, there is no need of E-MSI MAC CE. Suspension of services can be indicated by a regular MSI only with a specific value for STOP-MTCH, say 2046 (or some other reserved pattern). Also optimized MSI can be scheduled at MCH scheduling period multiple times before actually service is discontinued. On receiving service suspension information, the UE (100) may decide to switch to Unicast mode in advance and continue receiving service in both the modes for sometimes before service stops on multicast channel.

In one embodiment, for service suspension pre-intimation notification, MAC Control CE is used with a special value field (e.g. 2046, or some reserved pattern) defined to indicate service suspension in NR.

In another embodiment, it is proposed that NR supports different modes of service switching which includes UE initiated mode (when signal coverage issue is realized by the UE (100) and MBS service layer/application signaling to network can cause service migration), network initiated mode (when congestion or user density/demand change is determined by network). Potentially, UE assisted mode wherein the UE (100) can indicate certain essential parameters which can help network for possible service delivery mode change should be allowed. These parameters could be periodically measured quantities like RSRP (Reference Signal Relative Power)/SINR (Signal to Interference Noise Ratio)/CQI (Channel Quality Indicator)/CSI (Channel State Indicator) for the physical channel (i.e. PDSCH or group-common PDSCH carrying relevant multicast service traffic) and/or TMGI, which UE is availing or an event-based specific indication for service migration need. Obviously, only connected mode UEs can provide this assistance information to network. As idle/inactive mode UEs needs to perform RACH and establish a connection before it can convey this event notification, in one embodiment, it is proposed that one of the following approaches are adopted namely (a) idle/inactive mode UEs are not allowed to report the assistance/event notification, (b) only inactive mode UEs are allowed to report the assistance/event notification, (c) idle mode and/or inactive mode UEs are allowed to report the assistance/event notification with probability factor to limit the actual number of UEs participating, and/or (d) both idle/inactive mode UEs are allowed to report the assistance/event notification.

In another embodiment, along with the UE Initiated and Network Initiated, UE assistance for service delivery mode change is considered in NR. Assistance information can include periodic measurements and/or event based service migration need indication.

In another embodiment, the gNodeB (200) is configured to establish the MBS session with the UE (100) for reception of a high priority MBS. Further, the gNodeB (200) is configured to receive a service migration request from the UE (100). The service migration request includes a service migration identifier information comprising a priority service identifier of the high priority MBS. The service migration request is received in one of a MBS interest indication message and a UE assistance information. Based on the service migration request, the gNodeB (200) is configured to determine a change a BWP configuration for the UE (100), a BTC for reception of the MBS at the UE (100), deactivate lower priority MBS at the UE (100). Further, the gNodeB (200) is configured to transmit a service migration response to the UE (100) for service migration. The service migration response includes an updated BWP configuration in response to determining by the gNodeB (200) to change the BWP configuration for the UE (100), an updated bearer configuration in response to determining by the gNodeB (200) to the BTC for the UE (100), and a G-RNTI or G-CS-RNTI of lower priority MBS, a LCID information of lower priority MBS, an identifier of the MBS session or TMGI for service deactivation in response to determining by the gNodeB (200) to deactivate lower priority MBS at the UE (100). The service migration response is sent in one of a RRC connection reconfiguration message and a MAC CE.

In another embodiment, the gNodeB (200) is configured to establish a MBS session with the UE (100) for reception of MBS in a first delivery mode. Further, the gNodeB (200) is configured to receive the MBS interest indication message and a UE assistance information message comprising a delivery mode change to a second delivery mode from the UE (100). After receiving the at least one of MBS interest indication message and the UE assistance information message comprising the delivery mode change to the second delivery mode from the UE (100), the gNodeB (200) is configured to send a RRC connection reconfiguration message to the UE (100). The RRC connection reconfiguration message includes a bearer configuration for receiving the MBS in the second delivery mode. Further, the gNodeB (200) is configured to receive a RRC connection reconfiguration complete message from the UE (100).

Further, the gNodeB (200) is configured to is set a threshold for a signal strength and a channel quality at the UE (100) to receive one of the MBS interest indication message and the UE assistance information message from the UE (100).

In another embodiment, the gNodeB (200) is configured to establish a MBS session with the UE (100) for reception of MBS. Further, the gNodeB (200) is configured to receive a MBS interest indication from the UE (100) to handover from the source gNodeB to a target gNodeB from a plurality of target gNodeBs (200b-200n). After receiving the MBS interest indication, the gNodeB (200) is configured to send the MBS interest indication to at least one target gNodeB from the plurality of target gNodeBs (200b-200n). Further, the gNodeB (200) is configured to receive a RRC connection reconfiguration message from the target gNodeB. The RRC connection reconfiguration message includes the target gNodeB information, measurements and execution conditions for the at least one target gNodeB and a MBS configuration on the at least one target gNodeB for the at least one MBS including bearer configuration, DRX configuration, G-RNTI, G-CS-RNTI, delivery mode, security context keys and other information. Further, the gNodeB (200) is configured to send the RRC connection reconfiguration message to the UE (100) to perform the handover to at least one target gNodeB from the plurality of target gNodeBs.

In an embodiment, the UE (100) is configured to establish the MBS session with the gNodeB (200) and receive the MBS from the gNodeB (200) during the MBS session using the first delivery mode. Further, the UE (100) is configured to receive the indication from the gNodeB (200) indicating that the MBS going to get suspended or deactivated prior to suspension or deactivation of the MBS at the UE (100). Further, the UE (100) is configured to receive the RRC connection reconfiguration message comprising the bearer configuration for the second delivery mode from the gNodeB (200). Further, the UE (100) is configured to switch from the first delivery mode to the second delivery mode by duplicating reception in the first delivery mode and the second delivery mode for a transition configuration (e.g. a time period) or a timer based on the bearer configuration. The transition configuration (e.g. a time period) or the timer is configured by the gNodeB (200). The transition configuration (e.g. a time period) or the timer is locally set by the UE (100). The bearer configuration is one of a PTP bearer configuration, a PTM bearer configuration, and a split MBS bearer configuration. Further, the UE (100) is configured to send a RRC reconfiguration complete message to the gNodeB (200).

In another embodiment, the UE (100) is configured to establish the MBS session with the gNodeB (200) for reception of the high priority MBS. Further, the UE (100) is configured to detect a limited capability at the UE (100) for reception of the high priority MBS based on the BWP configuration, a resource processing, and a number of concurrent services reception at the UE (100). Further, the UE (100) is configured to send the service migration request to the gNodeB (200). The service migration request includes a service migration identifier information comprising the priority service identifier of the high priority MBS. Further, the UE (100) is configured to receive the service migration response from the gNodeB (200) for service migration. Further, the UE (100) is configured to continue reception of the high priority service based on the service migration response.

In another embodiment, the UE (100) is configured to establish the MBS session with the gNodeB (200) for reception of the MBS in a first delivery mode. Further, the UE (100) is configured to measure the signal strength and a channel quality on the PDSCH or group-common PDSCH channel carrying MBS. The signal strength and the channel quality on the PDSCH or group-common PDSCH channel carrying the MBS corresponds to measure a CSI-RS based RSRP, a SINR, a CQI, a CSI on the PDSCH or group-common PDSCH channel.

Further, the UE (100) is configured to detect that the strength and the channel quality reached a configured threshold. Further, the UE (100) is configured to send the MBS interest indication message and the UE assistance information message including a delivery mode change to a second delivery mode to the gNodeB (200). Further, the UE (100) is configured to receive a RRC connection reconfiguration message from the UE (100). The RRC connection reconfiguration message includes a bearer configuration for receiving the MBS in the second delivery mode. Further, the UE (100) configures the bearer configuration for receiving the MBS in the second delivery mode. Further, the UE (100) is configured to send a RRC connection reconfiguration complete message to the gNodeB (200).

In another embodiment, the UE (100) is configured to establish the MBS session with a source gNodeB for reception of at least one MBS. Further, the UE (100) is configured to send the MBS interest indication to the source gNodeB to handover from the source gNodeB to a target gNodeB from a plurality of target gNodeBs. Further, the UE (100) is configured to receive a RRC connection reconfiguration message from the source gNodeB. The RRC connection reconfiguration message includes the target gNodeB information, measurements and execution conditions for the target gNodeB, and a MBS configuration on the target gNodeB for the at MBS. Further, the UE (100) is configured to perform measurements and determine the execution conditions met for at least one of the target gNodeB and fulfilling at least one interested MBS support. Further, the UE (100) is configured to perform a handover from the source gNodeB to the target gNodeB based on the RRC connection reconfiguration message. Further, the UE (100) is configured to send a RRC connection reconfiguration complete message to the target gNodeB. Further, the UE (100) is configured to measure and determine the execution conditions met for the target gNodeB and fulfilling at least one interested MBS support.

An UE may be only required to support reception of a single MBS service at a time. This is due to limitation on the number of physical channel(s) an UE can support. However, it would be drastic when UE is engaged with an active service reception and a higher priority or critical service is initiated. This could only be addressed with Option 1: Network does scheduling of each MBS service dis-jointly i.e. not more than one service is scheduled at a time. However, this may be limiting for network scheduling operation as it is unaware which UEs availing which combination of services and limits overall number of services support and/or increases service latency.

Option 2: UE terminates lower priority service and pursues reception of the higher priority/critical services.

Option 3: Service migration is requested and performed for MBS service which cannot be availed. Event based service migration need indication can be useful to facilitate this migration. The case can be applicable for UE which is in idle, inactive or connected mode.

In another embodiment, disjoint scheduling of each multicast service or migration/termination of lower priority service options is considered for enabling priority/critical service on PTM mode.

As UE gets to know about service unavailability in PTM from updated MCCH, there is bound to be some finite interruption time before service is regained. To have Make-Before-Break service switching approach in NR, it is important to have pre-intimation of the service suspension. This pre-intimation can be provided by a PTM Service Suspension MAC Control Element which conveys that transmission of MTCH for specified G-RNTI or G-CS-RNTI is going to be suspended. UE on receiving this MAC CE can initiate setting up PTP link through unicast mode, before the actual PTM service suspension as informed in updated MCCH.

Network may decide to send this information multiple times in advance before actual suspension is informed in MCCH. This will increase chances of UE moving to other cell or other service mode for service continuity. UE, however, can determine duplicated/repeated transmission if it has already received recently. In general, UE can determine the potential migration completion by the start of the next scheduled MCCH which will carry updated MCCH and/or a stipulated time duration. During the transition phase when migration from PTM to PTP mode is in progress, UE may sustain the PTM connection and may also receive from both PTM and PTP modes in parallel. It would need to determine the duplicate packets reception and discard of the same. The duplicate reception and discard is performed at the service or application layer. Also when UE is pre-intimated with the MAC CE, MAC or lower layer informs the higher layer or service layer about the same and initiate for the migration of the service delivery mode.

In another embodiment, it is proposed to have the MAC CE or the pre-intimation indication as part of the MBS traffic channel (i.e. each MBS traffic e.g. MTCH). In another embodiment, the MAC CE or pre-intimation indication can be mapped to a specific MTCH or a special MTCH channel e.g. the one which carries service announcement information or is provided through MCCH channel itself. For example, service suspension intimation may be provided by MCCH in previous modification period before actual update of the MCCH in the next modification period.

In one embodiment, NR adopts a pre-intimation for PTM service suspension with a PTM Service Suspension MAC Control Element. It conveys the G-RNTI or G-CS-RNTI for MTCH which is to be suspended.

Service continuity requires that the UE (100) receiving broadcast/multicast service, should be able to continue receiving the service (via unicast or multicast) seamlessly even during mobility. There can be multiple scenarios, which need to be considered for ensuring this, i.e.

A. The UE (100) is moving to a cell where multicast support is not available.
B. The UE (100) is moving to a cell where multicast support for the intended service is not there.
C. The UE (100) is moving to a cell where multicast support is available for the intended service with a different configuration as that of the serving cell.
D. The UE (100) is moving to a cell where multicast support is available with same configuration as that of serving cell.

Therefore, the UE needs to know MBS service support and configuration of the neighboring cells in advance for uninterrupted service continuity. Further, this has been issue with legacy (LTE MBMS), where the UE (100), during mobility, needs to re-acquire LTE MBMS support and configuration information from the target cell. This involves multiple sequential steps before actual service is accessible. The UE (100) would need to decode System Information Block 2 (SIB-2) to get the MBSFN sub-frame configuration, further read SIB-13 to get MBSFN area ID and MCH scheduling information and further decode MCCH on the target cell before listening to the MTCH.

This can be alleviated by providing list of neighbor cells (up to N cells) that support MBS services. Further, bitmap for neighbor cells which supporting each specific MBS service is provided. The UE (100) can also deduce from absence of the list that MBS services specified in configuration are not supported in any neighbor cells and can, therefore, consider availing service through unicast mode.

Therefore, it seems appropriate to adopt this approach in NR for providing neighbor cell information for the MBS services to maintain service continuity during mobility.

In one embodiment, it is considered to adopt this approach in NR for receiving the neighbor cell frequency supporting a MBS service through broadcast information i.e. conveyed by MCCH. The MTCH-InfoList provides the neighbor cell info for each MBS session as present in mbsSessionInfo. The neighbor cell info contains the earfcn and physical cell id on which a particular service is available. This provides additional information to the UE (100) and thus the UE (100) can avail the required MBS service by setting up its mobility to the required cell by prioritizing the frequency or determining MBS interest. However, to facilitate the seamless and lossless service continuity, it would be very effective, if the UE (100) can utilize same G-RNTI or G-CS-RNTI to decode the existing service on the target cell or bearer configuration information for the existing service on the target service is pre-informed e.g. via handover command/RRC reconfiguration message before the actual handover to the target is performed. G-RNTI has been used in a cell specific configuration basis in SCPTM, however, to facilitate seamless connectivity over a large geographic region consisting of many cells, in one embodiment, network defines and maintains same G-RNTI or G-CS-RNTI for a specific MBS service (identified by a TMGI and/or MBS Session Identity) across multiple cells or entire network. That is to say, there is a consistent one-to-one mapping between G-RNTI/G-CS-RNTI and TMGI across the network.

In another embodiment, MBS or multicast service bearer configuration parameters are pre-informed to the UE (100) which is being handed-over to a new target cell. The bearer configuration is provided as part of handover command or RRC reconfiguration or MCCH message in the source cell. With the prior configuration information, the UE (100) applies and avails MBS or multicast service immediately when moving to target cell without any wait for receiving applicable configuration from target cell.

To initiate the handover and ensure service continuity for the MBS or multicast service, UE sends the MBS Interest Indication (MII) message to the network in which UE indicates its interest to receive a particular service on the available frequency. Based on this network can decide to handover the UE to a suitable target cell where the service can be continued and related configuration information can be provided to the UE in the source cell itself.

In another embodiment, when UE moves from one cell to another in NR, target cell scheduling information of the interested service reported in MBSInterestIndication can be sent to UE along with the hand-over or re-direction message. This will be helpful in seamless mobility with minimal or no loss of MBS data during transition phase.

There is possibility of NR to LTE mobility during EPSFB call or due to UE mobility from NR to LTE cell. Provision of service continuity during the RAT change will thus enhance the performance. Thus, we propose a provision to send neighbor cell LTE supported cell and frequency through broadcast or dedicated signaling. In addition, UE can send MBSInterestIndication for the LTE supported frequency and SAI as well.

In another embodiment, MBS Interest Indication message transmission is triggered based on the UE meeting certain reliability related conditions which includes but not limited to specific thresholds of RSRP (Reference Signal Relative Power), SINR (Signal to Interference Noise Ratio), CQI (Channel Quality indicator) for the respective physical channel (PDSCH or group-common PDSCH) that carries pertinent services UE is receiving and/or interested to receive. Based on these reliability conditions, UE determines to whether to transmit or not MII message and what to include in the message contents e.g. frequency, service information etc. Additionally, it is proposed that MII message can also include reliability related conditions to be reported by the UE when certain thresholds are met. This can facilitate network to determine if specific procedures to enhance reliability are considered and/or applied e.g. retransmission, adapting link parameters like modulation and coding scheme or handover operations.

In another embodiment, it is proposed to have distinct triggers for MII message building and transmission with respect to different set of services. These different set of services may include MBS services, LTE MBMS services, ROM services, FeMBMS services, Terrestrial broadcast services, mixed mode services and so on. This way, it is ensured MII triggering is controlled and pertains to specific and applicable set of services only and avoid redundant or larger message for transmission.

In another embodiment, prioritization indicator across different modes of reception e.g. PTM, PTP, LTE MBMS, unicast mode etc. is indicated and is included in MII message. UE provides this indication to facilitate network to suitably assign/migrate/transit the UE to prioritized mode of reception.

In another embodiment, it is proposed that if ROM services are received on one or more component carrier(s) along with MBS or multicast services on one or more component carrier(s) of the UE and/or different subcarrier spacing are utilized for services and/or computational requirements to receive the different services are not similar, UE indicates in the MII message relevant set of parameters that includes but not limited to sub-carrier spacing, duplex mode, frequency, computational requirement parameter etc.

Network can poll UE to know how many users are accessing broadcast method of reception for a particular MBS service, this helps network to estimate whether to continue the service on MBS or unicast method. This method can be more useful in NR technology as it will help network to dynamically make MBS service available in a particular cell depending on demand rather UE waiting to move to another cell/frequency providing MBS service. In one of the embodiment, MBS counting procedure is supported in NR to facilitate dynamic configuration, sustenance and release of MBS services based on UE interest.

Figure 2:
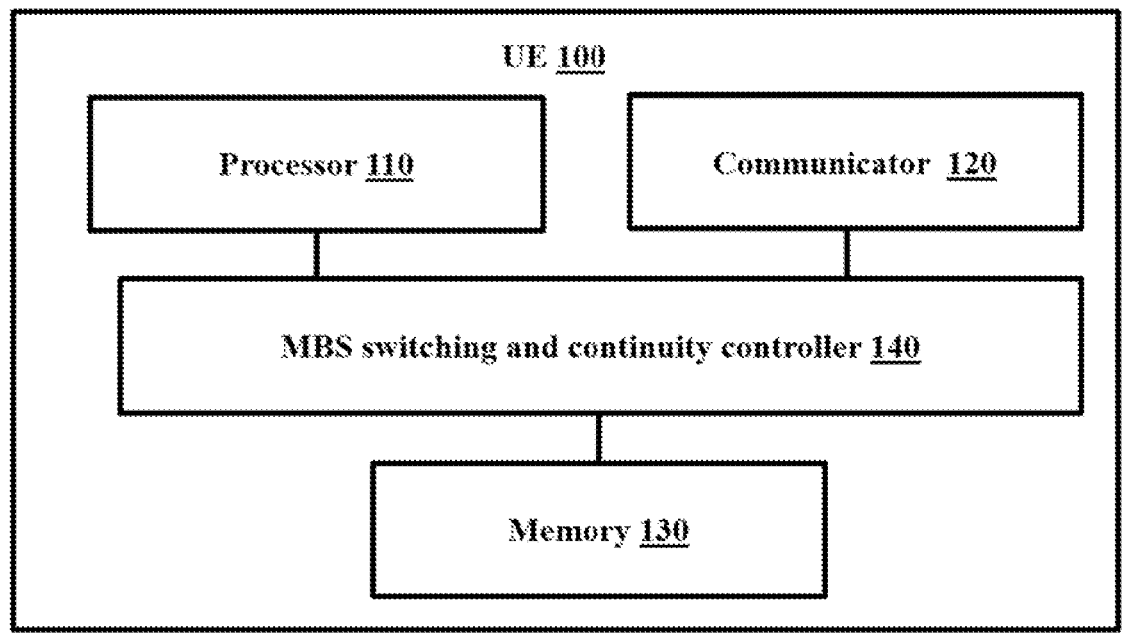
FIG. 2 shows various hardware components of a UE, according to an embodiment as disclosed herein.

FIG. 2 shows various hardware components of the UE (100), according to an embodiment as disclosed herein. In an embodiment, the UE (100) includes a processor (110), a communicator (120), a memory (130), and a MBS switching and continuity controller (140). The processor (110) is coupled with the communicator (120), the memory (130), and the MBS switching and continuity controller (140).

In an embodiment, the MBS switching and continuity controller (140) is configured to establish a MBS session with the gNodeB (200) and receive the MBS from the gNodeB (200) during the MBS session using the first delivery mode. Further, the MBS switching and continuity controller (140) is configured to receive the indication from the gNodeB (200) indicating that the MBS going to get suspended or deactivated prior to suspension or deactivation of the MBS at the UE (100). Further, the MBS switching and continuity controller (140) is configured to receive the RRC connection reconfiguration message comprising the bearer configuration for the second delivery mode from the gNodeB (200). Further, the MBS switching and continuity controller (140) is configured to switch from the first delivery mode to the second delivery mode by duplicating reception in the first delivery mode and the second delivery mode for the transition configuration (e.g. a time period) or the timer based on the bearer configuration. Further, the MBS switching and continuity controller (140) is configured to send a RRC reconfiguration complete message to the gNodeB (200).

In another embodiment, the MBS switching and continuity controller (140) is configured to establish the MBS session with the gNodeB (200) for reception of the high priority MBS. Further, the MBS switching and continuity controller (140) is configured to detect the limited capability at the UE (100) for reception of the high priority MBS based on the BWP configuration, the resource processing, and the number of concurrent services reception at the UE (100). Further, the MBS switching and continuity controller (140) is configured to send the service migration request to the gNodeB (200). The service migration request includes the service migration identifier information comprising the priority service identifier of the high priority MBS. Further, the MBS switching and continuity controller (140) is configured to receive the service migration response from the gNodeB (200) for service migration. Further, the MBS switching and continuity controller (140) is configured to continue reception of the high priority service based on the service migration response.

In another embodiment, the MBS switching and continuity controller (140) is configured to establish the MBS session with the gNodeB (200) for reception of the MBS in the first delivery mode. Further, the UE (100) is configured to measure the signal strength and a channel quality on the PDSCH or group-common PDSCH channel carrying MBS. The signal strength and the channel quality on the PDSCH or group-common PDSCH channel carrying the MBS corresponds to measure of a CSI-RS based RSRP, a SINR, a CQI, a CSI on the PDSCH or group-common PDSCH channel.

Further, the MBS switching and continuity controller (140) is configured to detect that the strength and the channel quality reached a configured threshold. Further, the MBS switching and continuity controller (140) is configured to send at least one of the MBS interest indication message and the UE assistance information message including the delivery mode change to the second delivery mode to the gNodeB (200). Further, the MBS switching and continuity controller (140) is configured to receive the RRC connection reconfiguration message from the UE (100). The RRC connection reconfiguration message includes the bearer configuration for receiving the MBS in the second delivery mode. Further, the MBS switching and continuity controller (140) configures the bearer configuration for receiving the MBS in the second delivery mode. Further, the MBS switching and continuity controller (140) is configured to send a RRC connection reconfiguration complete message to the gNodeB (200).

In another embodiment, the MBS switching and continuity controller (140) is configured to establish the MBS session with the source gNodeB for reception of the MBS. Further, the MBS switching and continuity controller (140) is configured to send the MBS interest indication to the source gNodeB to handover from the source gNodeB to the target gNodeB from the plurality of target gNodeBs. Further, the MBS switching and continuity controller (140) is configured to receive the RRC connection reconfiguration message from the source gNodeB. The RRC connection reconfiguration message includes the plurality of target gNodeB information, measurements and execution conditions for the target gNodeB, and a MBS configuration on the target gNodeB for the at least one MBS including bearer configuration, DRX configuration, G-RNTI, G-CS-RNTI, delivery mode, security context keys and other information. Further, the MBS switching and continuity controller (140) is configured to perform measurements and determine the execution conditions met for at least one of the target gNodeB and fulfilling at least one interested MBS support. Further, the MBS switching and continuity controller (140) is configured to perform a handover from the source gNodeB to the target gNodeB based on the RRC connection reconfiguration message. Further, the MBS switching and continuity controller (140) is configured to send a RRC connection reconfiguration complete message to the target gNodeB.

The MBS switching and continuity controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model using the data driven controller (150). A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning mechanism to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning mechanism is a method for training a predetermined target device (for example, a robot) using a plurality of learning data to cause, allow, or control the target device to make a determination or prediction. Examples of learning mechanism include, but are not limited to, supervised learning, unsupervised learning, semi-supervised learning, or reinforcement learning.

Although the FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

Figure 3:
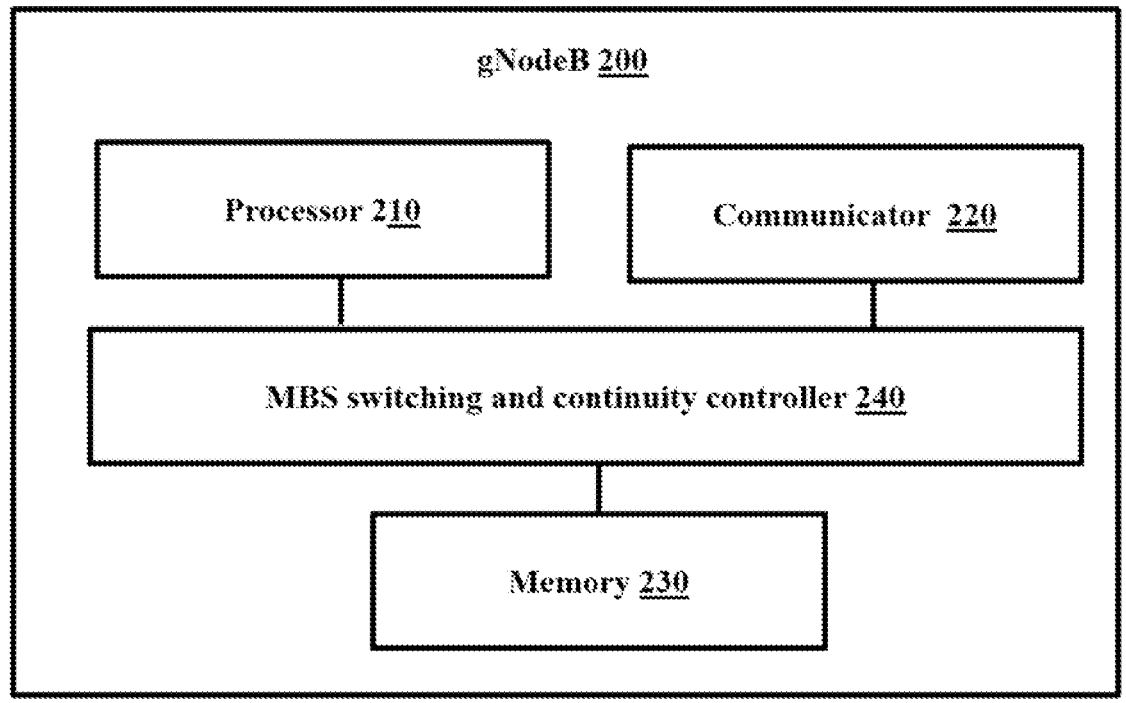
FIG. 3 shows various hardware components of a gNodeB, according to an embodiment as disclosed herein.

FIG. 3 shows various hardware components of the gNodeB (200), according to an embodiment as disclosed herein. In an embodiment, the gNodeB (200) includes a processor (210), a communicator (220), a memory (230) and a MBS switching and continuity controller (240). The processor (210) is coupled with the communicator (220), the memory (230), and the MBS switching and continuity controller (240).

In an embodiment, the MBS switching and continuity controller (240) is configured to establish the MBS session with the UE (100) and provide the MBS to the UE (100) during the MBS session. Further, the MBS switching and continuity controller (240) is configured to detect that the MBS is going to get suspended or deactivated. Based on the detection, the MBS switching and continuity controller (240) is configured to send the indication to the UE (100) indicating the MBS going to get suspended or deactivated prior to suspension or deactivation of the MBS at the UE (100).

Further, the MBS switching and continuity controller (240) is configured to detect that the MBS is received using the first delivery mode. Based on the detection, the MBS switching and continuity controller (240) is configured to send the RRC connection reconfiguration message including the bearer configuration for the second delivery mode to the UE (100) to switch from the first delivery mode to the second delivery mode for reception of the MBS. The bearer configuration can be at least one of a PTP bearer configuration, a PTM bearer configuration and a split MBS bearer configuration. The RRC connection reconfiguration message includes a timer or transition configuration (e.g. a time period) to switch from the first delivery mode to the second delivery mode for reception of the MBS. Further, the MBS switching and continuity controller (240) is configured to receive the RRC reconfiguration complete message from the UE (100).

In another embodiment, the MBS switching and continuity controller (240) is configured to establish the MBS session with the UE (100) for reception of a high priority MBS. Further, the gNodeB (200) is configured to receive the service migration request from the UE (100). The service migration request includes the service migration identifier information comprising the priority service identifier of the high priority MBS. Further, the MBS switching and continuity controller (240) is configured to determine a change a BWP configuration for the UE (100), a BTC for reception of the MBS at the UE (100), deactivate lower priority MBS at the UE (100) in response to receiving the service migration request. Further, the MBS switching and continuity controller (240) is configured to transmit a service migration response to the UE (100) for service migration. The service migration response includes an updated BWP configuration in response to determining by the gNodeB (200) to change the BWP configuration for the UE (100), an updated bearer configuration in response to determining by the gNodeB (200) to the BTC for the UE (100), and a G-RNTI or G-CS-RNTI of lower priority MBS, a LCID information of lower priority MBS, an identifier of the MBS session or TMGI for service deactivation in response to determining by the gNodeB to deactivate lower priority MBS at the UE (100).

In another embodiment, the MBS switching and continuity controller (240) is configured to establish the MBS session with the UE (100) for reception of MBS in the first delivery mode. Further, the gNodeB (200) is configured to receive the MBS interest indication message and the UE assistance information message comprising the delivery mode change to the second delivery mode from the UE (100). After receiving the at least one of MBS interest indication message and the UE assistance information message comprising the delivery mode change to the second delivery mode from the UE (100), the MBS switching and continuity controller (240) is configured to send the RRC connection reconfiguration message to the UE (100). The RRC connection reconfiguration message includes the bearer configuration for receiving the MBS in the second delivery mode. Further, the gNodeB (200) is configured to receive the RRC connection reconfiguration complete message from the UE (100).

In another embodiment, the MBS switching and continuity controller (240) is configured to establish the MBS session with the UE (100) for reception of MBS. Further, the MBS switching and continuity controller (240) is configured to receive the MBS interest indication from the UE (100) to handover from the source gNodeB to the target gNodeB from the plurality of target gNodeBs. After receiving the MBS interest indication, the MBS switching and continuity controller (240) is configured to send the MBS Interest Indication to the target gNodeB from the plurality of target gNodeBs. Further, the MBS switching and continuity controller (240) is configured to receive the RRC connection reconfiguration message from the target gNodeB. The RRC connection reconfiguration message includes the target gNodeB information, measurements and execution conditions for the at least one target gNodeB and a MBS configuration on the at least one target gNodeB for the at least one MBS. Further, the MBS switching and continuity controller (240) is configured to send the RRC connection reconfiguration message to the UE (100) to perform the handover to at least one target gNodeB from the plurality of target gNodeBs.

The MBS switching and continuity controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the plurality of modules/controller may be implemented through the AI model using the data driven controller. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning mechanism to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning mechanism is a method for training a predetermined target device (for example, a robot) using a plurality of learning data to cause, allow, or control the target device to make a determination or prediction. Examples of learning mechanisms include, but are not limited to, supervised learning, unsupervised learning, semi-supervised learning, or reinforcement learning.

Although the FIG. 3 shows various hardware components of the gNodeB (200) but it is to be understood that other embodiments are not limited thereon. In other embodiments, the gNodeB (200) may include less or more number of components. Further, the labels or names of the components are used only for illustrative purpose and does not limit the scope of the invention. One or more components can be combined together to perform same or substantially similar function in the gNodeB (200).

Figure 4:
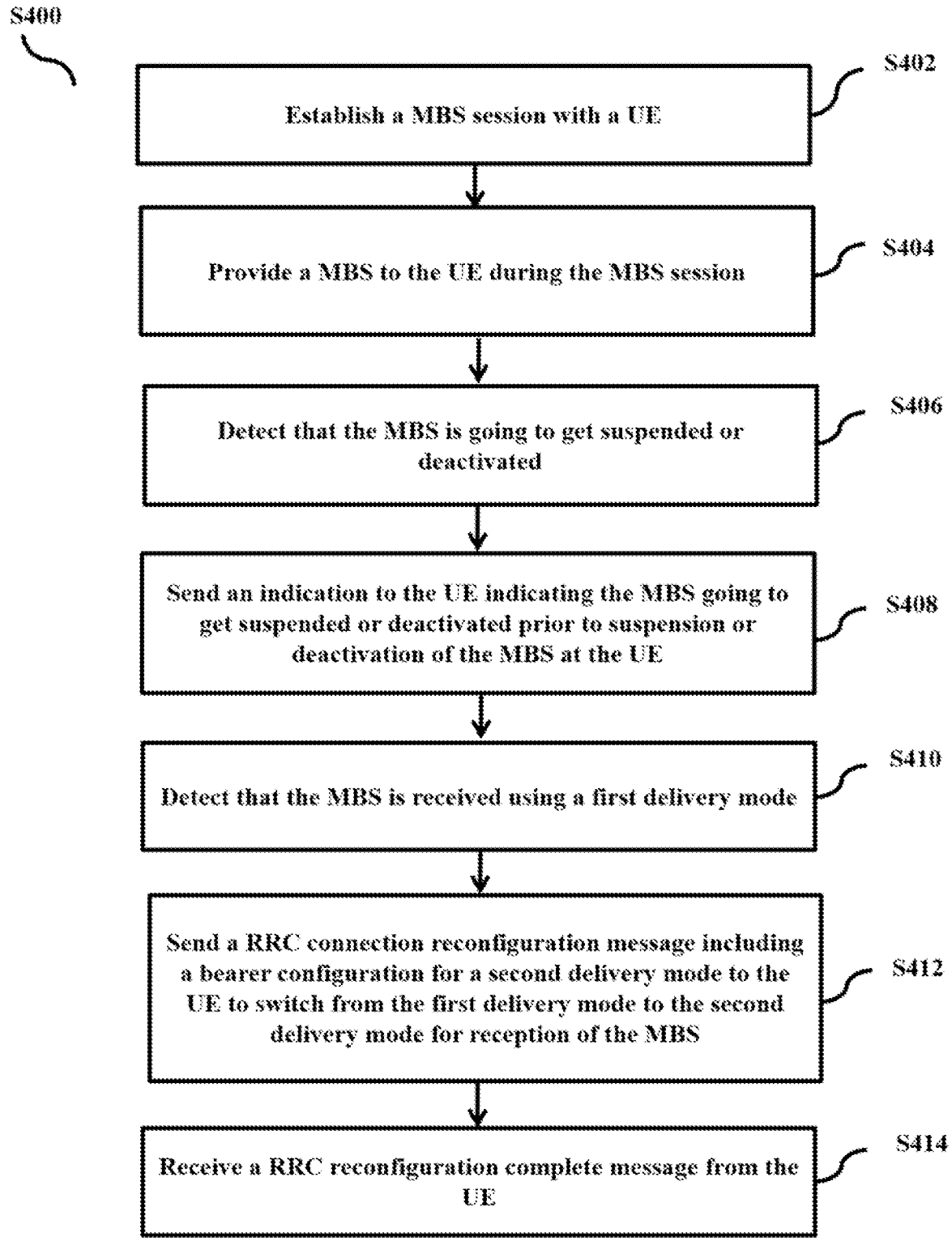
FIG. 4 is a flow chart illustrating a method for MBS switching and continuity in the 5G wireless network when the gNodeB detects that a MBS is going to get suspended or deactivated, according to an embodiment as disclosed herein.

FIG. 4 is a flow chart (S400) illustrating a method for MBS switching and continuity in the 5G wireless network (1000) when the gNodeB (200) detects that the MBS is going to get suspended or deactivated, according to an embodiment as disclosed herein. The operations (S402-S414) are handled by the MBS switching and continuity controller (240). At S402, the method includes establishing the MBS session with the UE (100). At S404, the method includes providing the MBS to the UE (100) during the MBS session. At S406, the method includes detecting that the MBS is going to get suspended or deactivated. At S408, the method includes sending an indication to the UE (100) indicating the MBS going to get suspended or deactivated prior to suspension or deactivation of the MBS at the UE (100). At S410, the method includes detecting that the MBS is received using the first delivery mode. At S412, the method includes sending the RRC connection reconfiguration message including a bearer configuration for a second delivery mode to the UE (100) to switch from the first delivery mode to the second delivery mode for reception of the MBS. At S414, the method includes receiving the RRC reconfiguration complete message from the UE (100).

Figure 5:
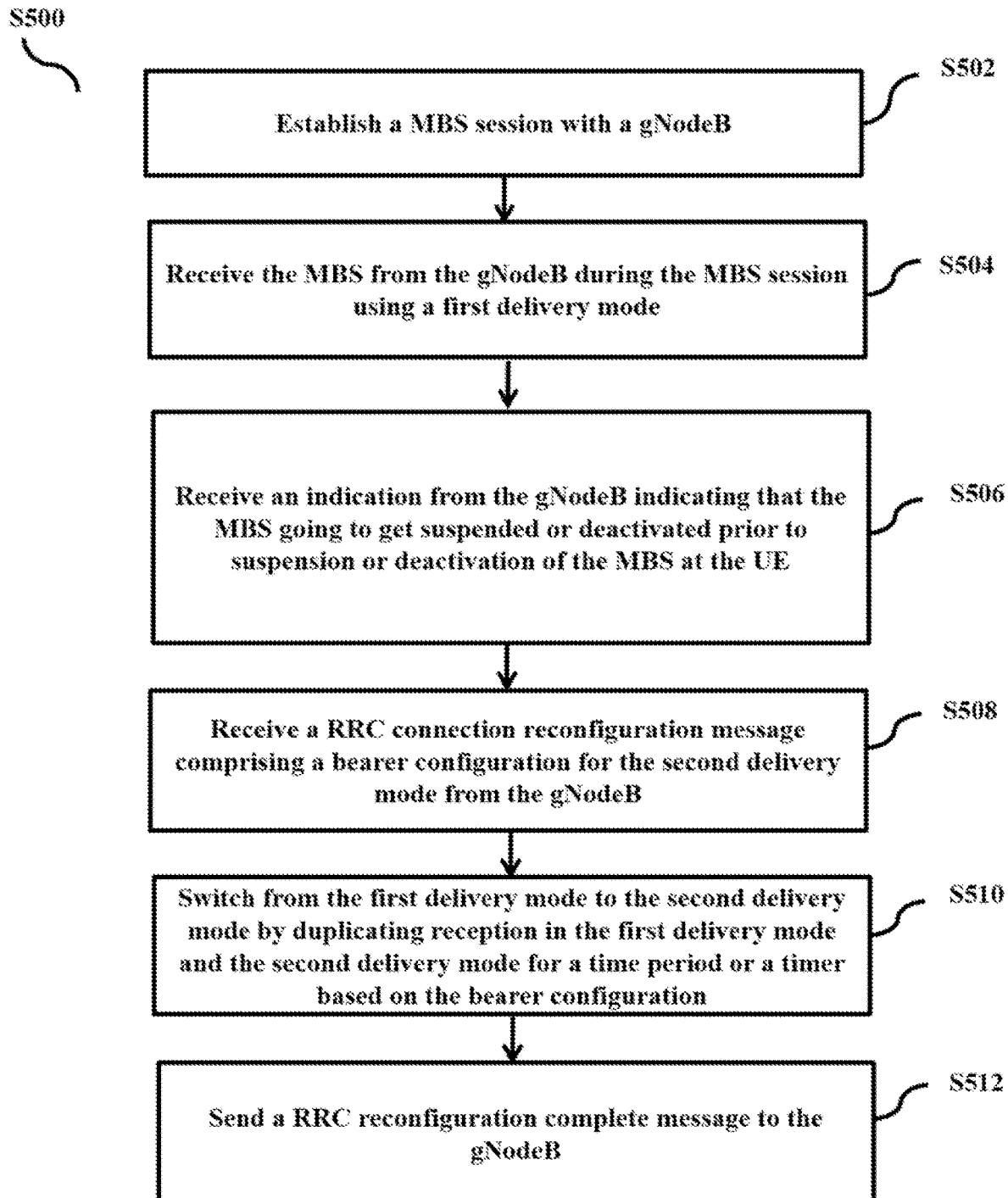
FIG. 5 is a flow chart illustrating a method for MBS switching and continuity in the 5G wireless network when the UE detects that the MBS is going to get suspended or deactivated, according to an embodiment as disclosed herein.

FIG. 5 is a flow chart (S500) illustrating a method for MBS switching and continuity in the 5G wireless network (1000) when the UE (100) detects that the MBS is going to get suspended or deactivated, according to an embodiment as disclosed herein. The operations (S502-S512) are handled by the MBS switching and continuity controller (140).

At S502, the method includes establishing, by the UE (100), the MBS session with the gNodeB (200). At S504, the method includes receiving the MBS from the gNodeB (200) during the MBS session using a first delivery mode. At S506, the method includes receiving the indication from the gNodeB (200) indicating that the MBS going to get suspended or deactivated prior to suspension or deactivation of the MBS at the UE (100). At S508, the method includes receiving the RRC connection reconfiguration message comprising a bearer configuration for the second delivery mode from the gNodeB (200). At S510, the method includes switching from the first delivery mode to the second delivery mode by duplicating reception in the first delivery mode and the second delivery mode for a transition configuration (e.g. a time period) or a timer based on the bearer configuration. At S512, the method includes sending the RRC reconfiguration complete message to the gNodeB (200).

Figure 6:
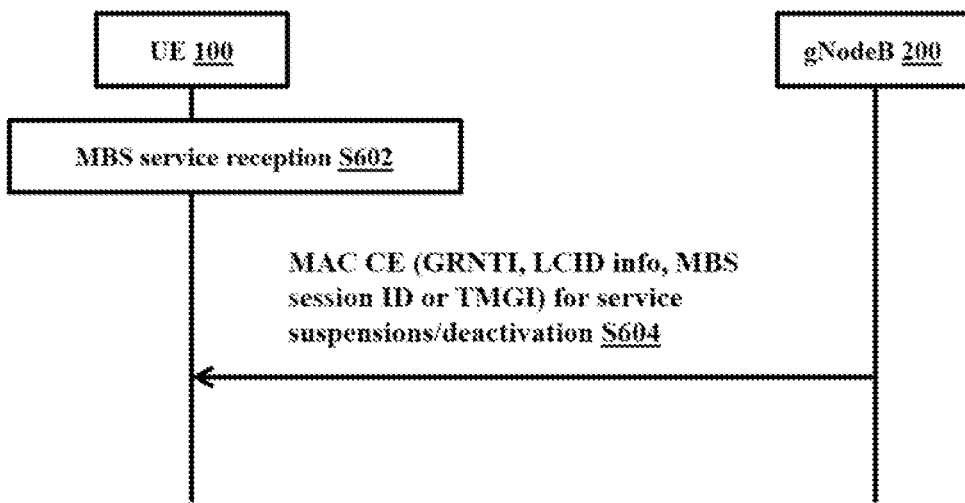
FIG. 6-FIG. 8 are example sequential flow diagrams illustrating step by step operations for the MBS switching and continuity in the 5G wireless network when the gNodeB detects that the MBS is going to get suspended or deactivated, according to an embodiment as disclosed herein.
Figure 7:
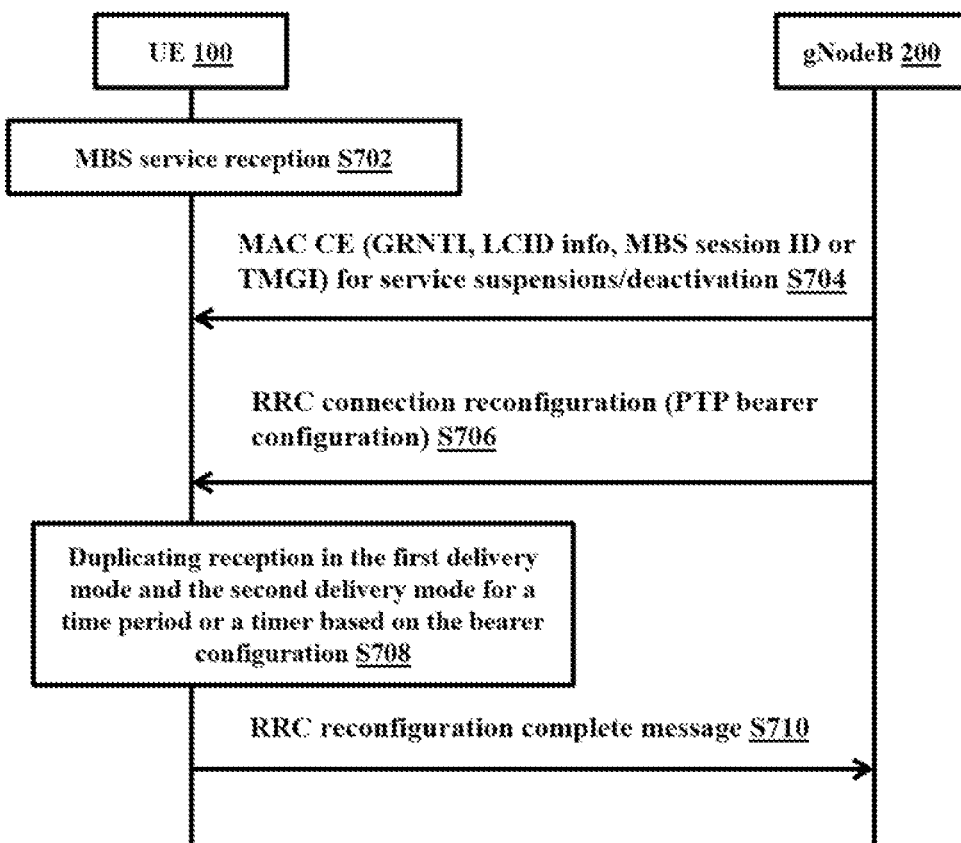
Figure 8:
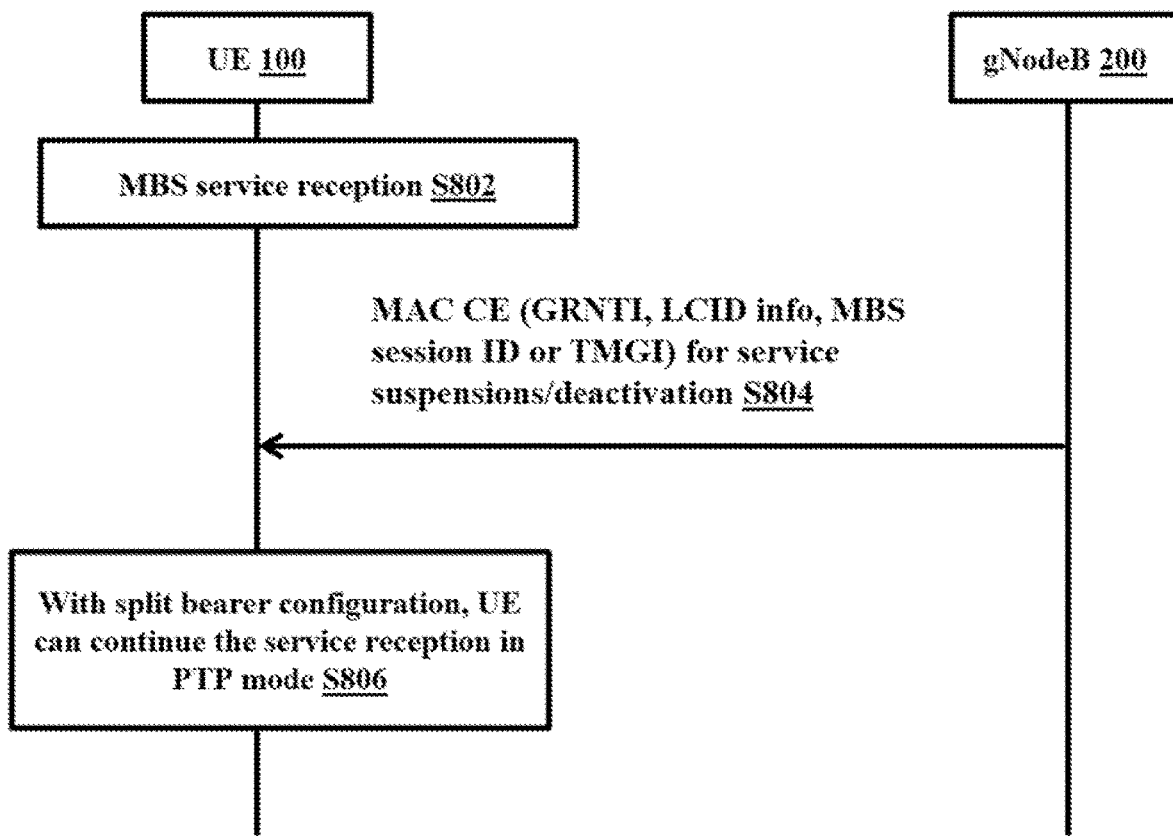

FIG. 6-FIG. 8 are example sequential flow charts illustrating a method for the MBS switching and continuity in the 5G wireless network (1000) when the gNodeB (200) detects that the MBS is going to get suspended or deactivated, according to an embodiment as disclosed herein.

As shown in the FIG. 6, at S602, the UE (100) is in the MBS service reception. At S604, the gNodeB (200) sends the MAC CE (includes GRNTI, LCID info, MBS session ID or TMGI) for service suspensions/deactivation to the UE (100).

As shown in the FIG. 7, at S702, the UE (100) is in the MBS service reception. At S704, the gNodeB (200) sends the MAC CE (includes GRNTI, LCID info, MBS session ID or TMGI) for the service suspensions/deactivation to the UE (100). At S706, the gNodeB (200) sends the RRC connection reconfiguration (including the PTP bearer configuration) to the UE (100). Based on the RRC connection reconfiguration, at S708, the UE (100) duplicates the reception in the first delivery mode and the second delivery mode for a transition configuration (e.g. a time period) or a timer based on the bearer configuration. At S710, the UE (100) sends the RRC reconfiguration complete message to the gNodeB (200).

As shown in the FIG. 8, at S802, the UE (100) is in the MBS service reception. At S804, the gNodeB (200) sends the MAC CE (includes GRNTI, LCD info, MBS session ID or TMGI) for the service suspensions/deactivation to the UE (100). At S806, with the split bearer configuration, the UE (100) can continue the service reception in the PTP mode.

Figure 9:
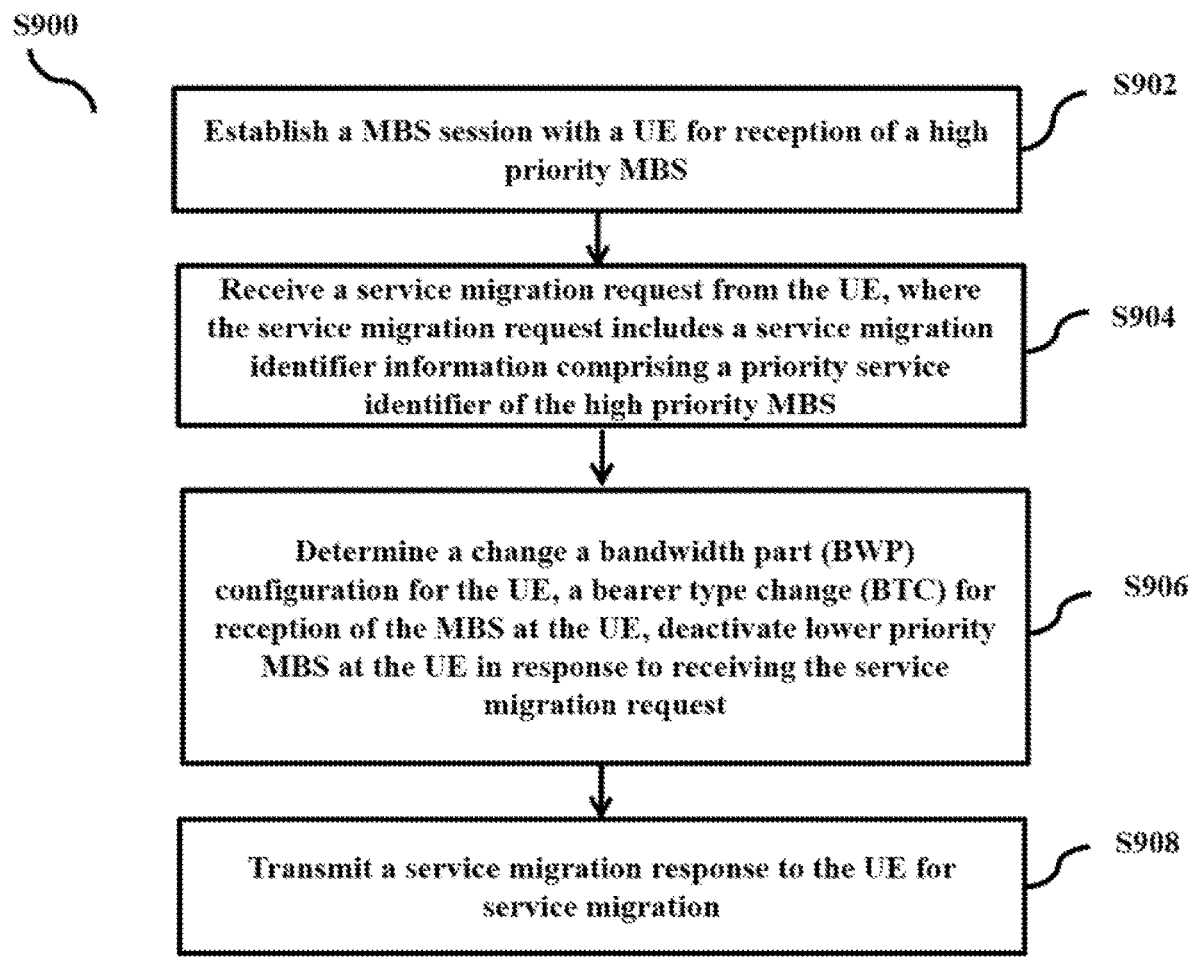
FIG. 9 is a flow chart illustrating a method for MBS switching and continuity in the 5G wireless network, when the gNodeB receives the service migration request from the UE, according to an embodiment as disclosed herein.

FIG. 9 is a flow chart (S900) illustrating a method for MBS switching and continuity in the 5G wireless network (1000), when the gNodeB (200) receives the service migration request from the UE (100), according to an embodiment as disclosed herein. The operations (S902-S908) are handled by the MBS switching and continuity controller (240).

At S902, the method includes establishing the MBS session with the UE (100) for reception of the high priority MBS. At S904, the method includes receiving the service migration request from the UE (100). The service migration request includes a service migration identifier information comprising a priority service identifier of the high priority MBS. At S906, the method includes determining a change a BWP configuration for the UE (100), a BTC for reception of the MBS at the UE (100), deactivate lower priority MBS at the UE (100) in response to receiving the service migration request. At S908, the method includes transmitting the service migration response to the UE (100) for service migration.

Figure 10:
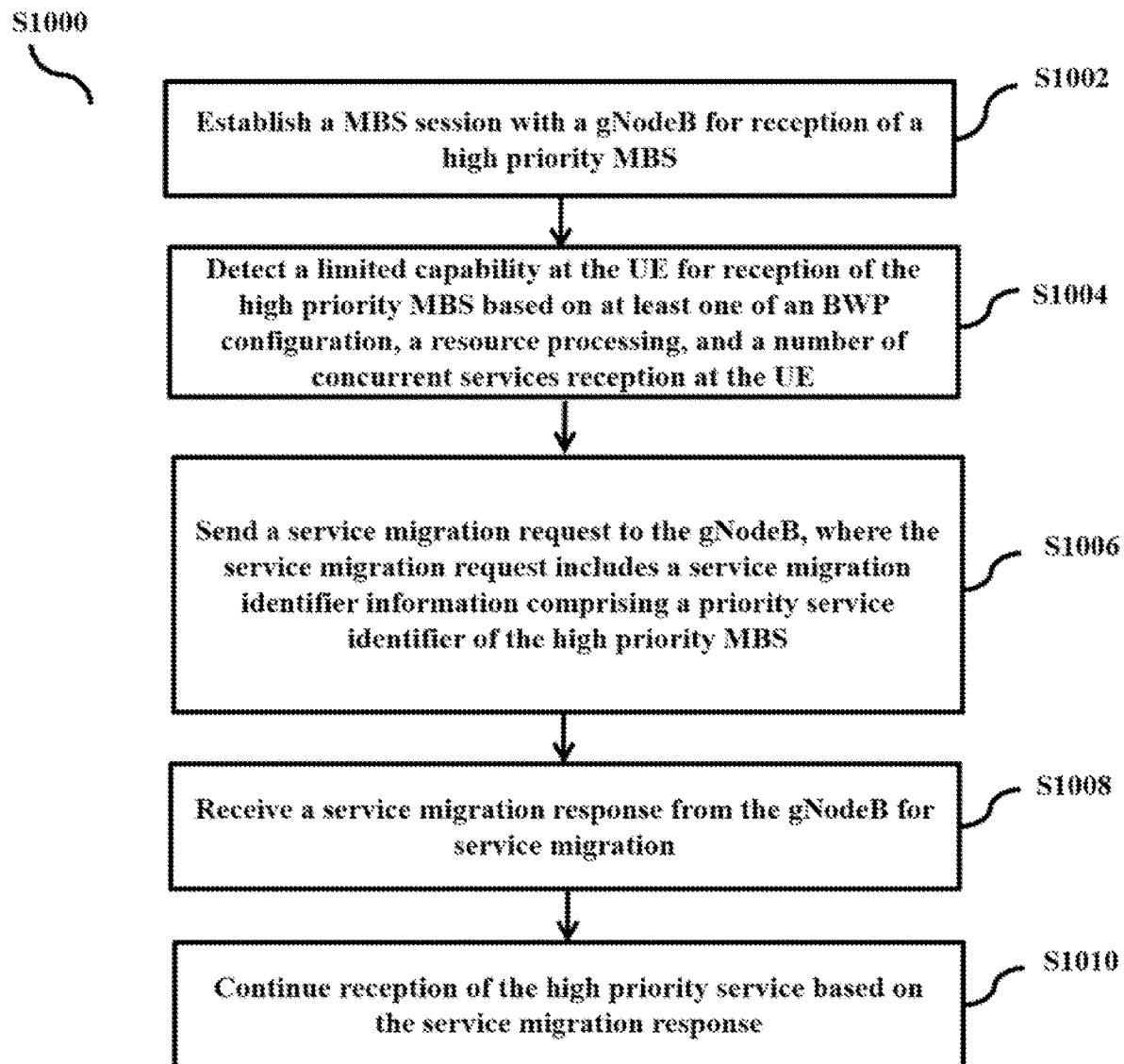
FIG. 10 is a flow chart illustrating a method for MBS switching and continuity in the 5G wireless network, when the UE sends the service migration request to the gNodeB, according to an embodiment as disclosed herein.

FIG. 10 is a flow chart (S1000) illustrating a method for MBS switching and continuity in the 5G wireless network (1000), when the UE (100) sends the service migration request to the gNodeB (200), according to an embodiment as disclosed herein. The operations (S1002-S1010) are handled by the MBS switching and continuity controller (140).

At S1002, the method includes establishing the MBS session with the gNodeB (200) for reception of the high priority MBS. At S1004, the method includes detecting the limited capability at the UE (100) for reception of the high priority MBS based on the BWP configuration, the resource processing, and a number of concurrent services reception at the UE (100). At S1006, the method includes sending the service migration request to the gNodeB (200). The service migration request comprises a service migration identifier information comprising a priority service identifier of the high priority MBS. At S1008, the method includes receiving the service migration response from the gNodeB (200) for service migration. At S1010, the method includes continuing reception of the high priority service based on the service migration response.

Figure 11:
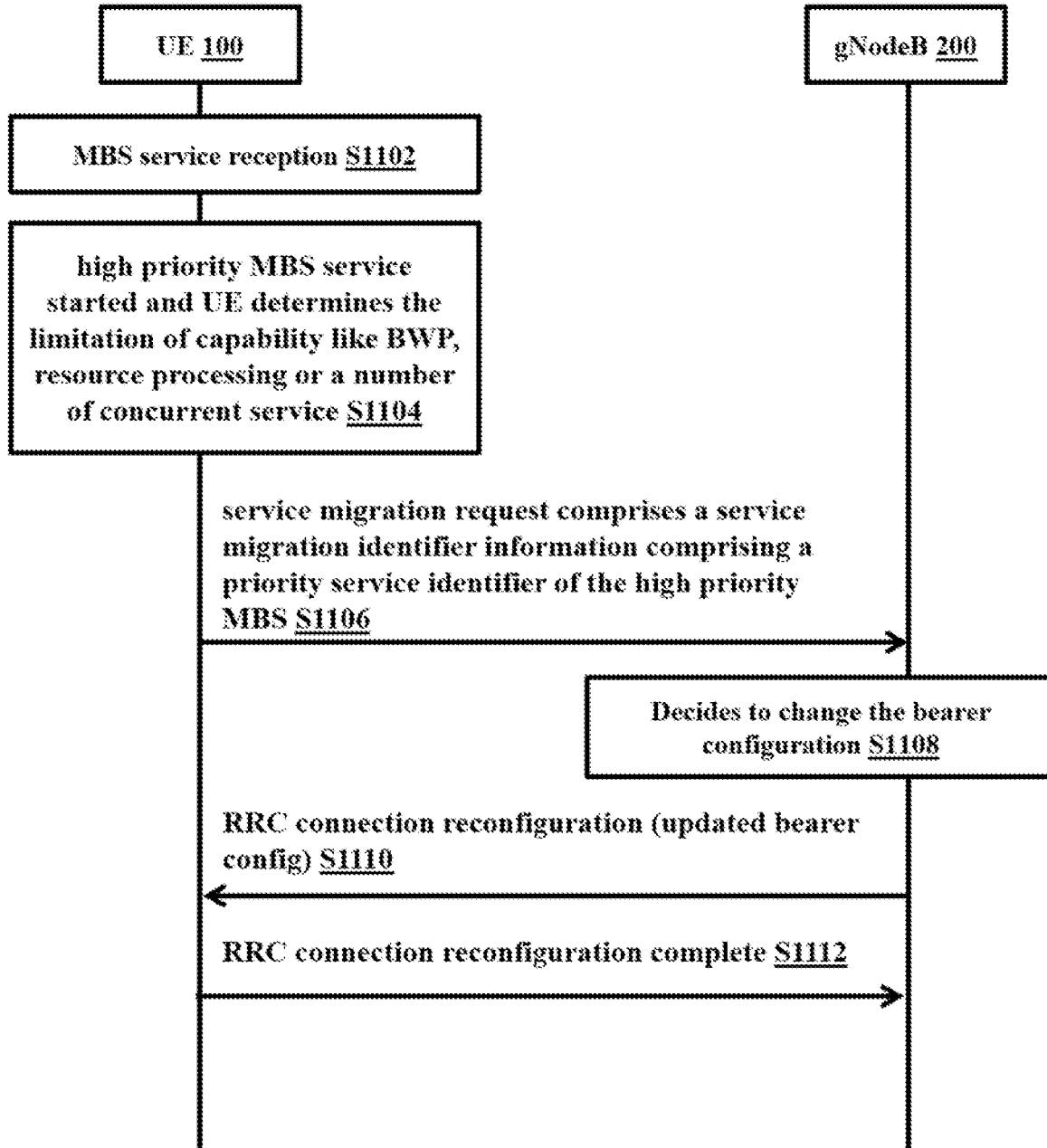
FIG. 11-FIG. 13 are example sequential flow diagrams illustrating step by step operations for MBS switching and continuity in the 5G wireless network, when the UE sends the service migration request to the gNodeB, according to an embodiment as disclosed herein.
Figure 12:
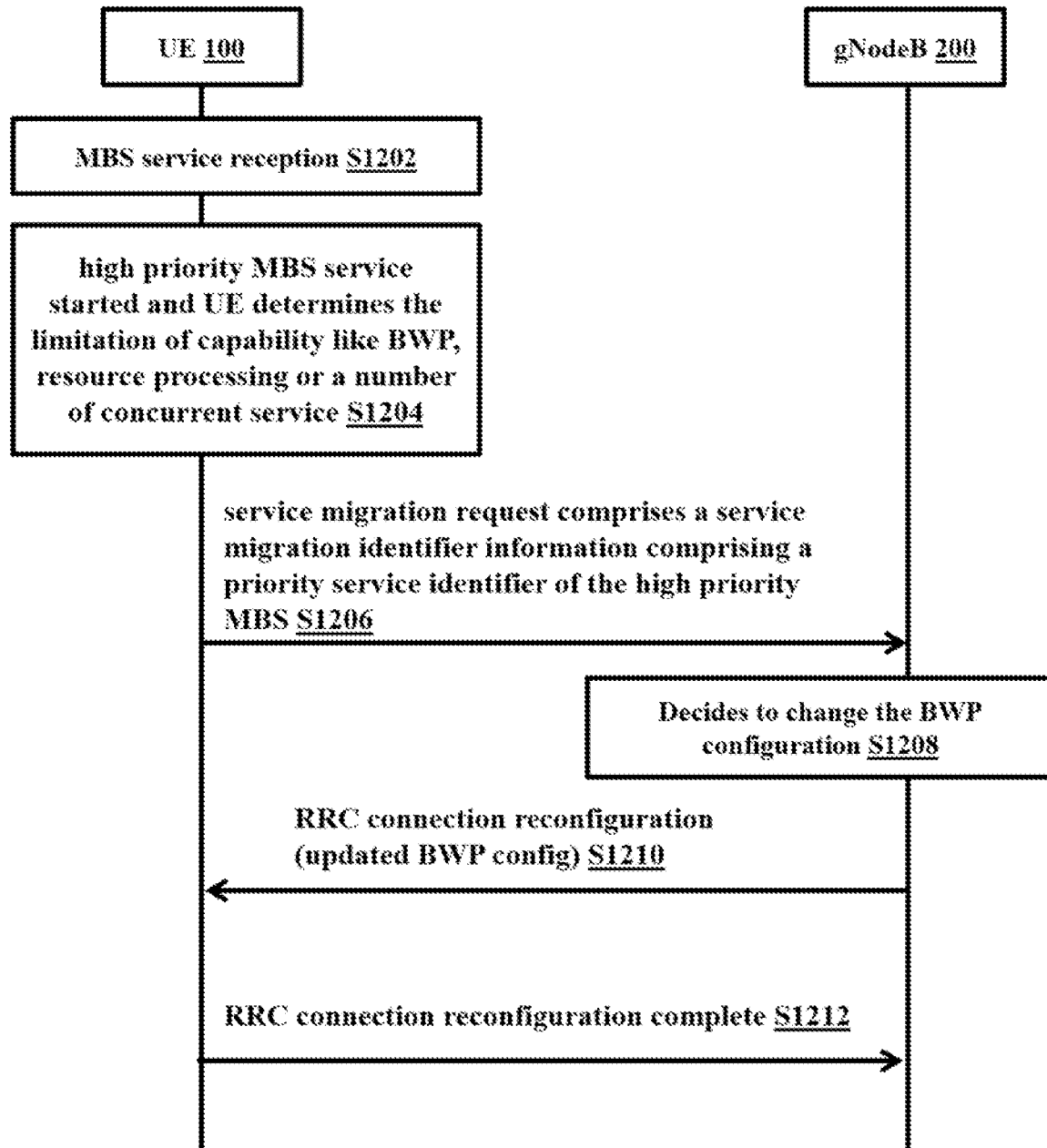
Figure 13:
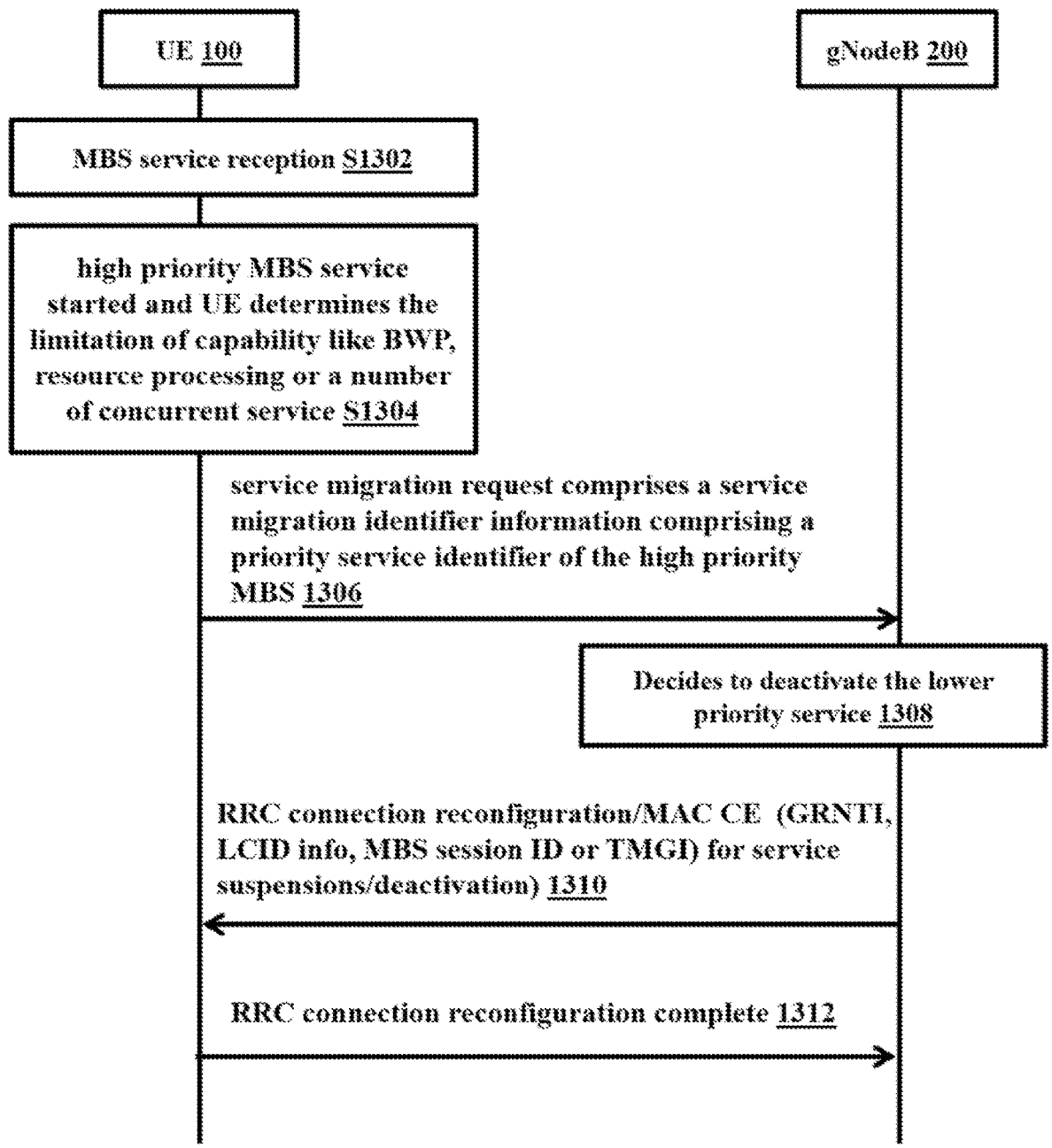

FIG. 11-FIG. 13 are example sequence flow diagrams illustrating step by step operations for MBS switching and continuity in the 5G wireless network (1000), when the UE (100) sends the service migration request to the gNodeB (200).

As shown in the FIG. 11, at S1102, the UE (100) is in the MBS service reception. At S1104, the UE (100) detects that the high priority MBS service is started and the UE (100) determines the limitation of capability like BWP, resource processing or a number of concurrent service. At S1106, the UE (100) sends the service migration request comprising a service migration identifier information having a priority service identifier of the high priority MBS to the gNodeB (200). At S1108, the gNodeB (200) decides to change the bearer configuration. At S1110, the gNodeB (200) sends the RRC connection reconfiguration (with updated bearer config) to the UE (100). At S1112, the UE (100) sends the RRC connection reconfiguration complete to the UE (100).

As shown in the FIG. 12, at S1202, the UE (100) is in the MBS service reception. At S1204, the UE (100) detects that the high priority MBS service is started and the UE (100) determines the limitation of capability like BWP, resource processing or a number of concurrent service. At S1206, the UE (100) sends the service migration request comprising the service migration identifier information having the service identifier of the high priority MBS to the gNodeB (200). At S1208, the gNodeB (200) decides to change the BWP configuration. At S1210, the gNodeB (200) sends the RRC connection reconfiguration (with updated BWP config) to the UE (100). At S1212, the UE (100) sends the RRC connection reconfiguration complete to the UE (100).

As shown in the FIG. 13, at S1302, the UE (100) is in the MBS service reception. At S1304, the UE (100) detects that the high priority MBS service is started and the UE (100) determines the limitation of capability like BWP, resource processing or a number of concurrent service. At S1306, the UE (100) sends the service migration request comprising the service migration identifier information having the service identifier of the high priority MBS to the gNodeB (200). At S1308, the gNodeB (200) decides to deactivate the lower priority service. At S1310, the gNodeB (200) sends the RRC connection reconfiguration/MAC CE for service suspensions/deactivation to the UE (100). At S1312, the UE (100) sends the RRC connection reconfiguration complete to the UE (100).

Figure 14:
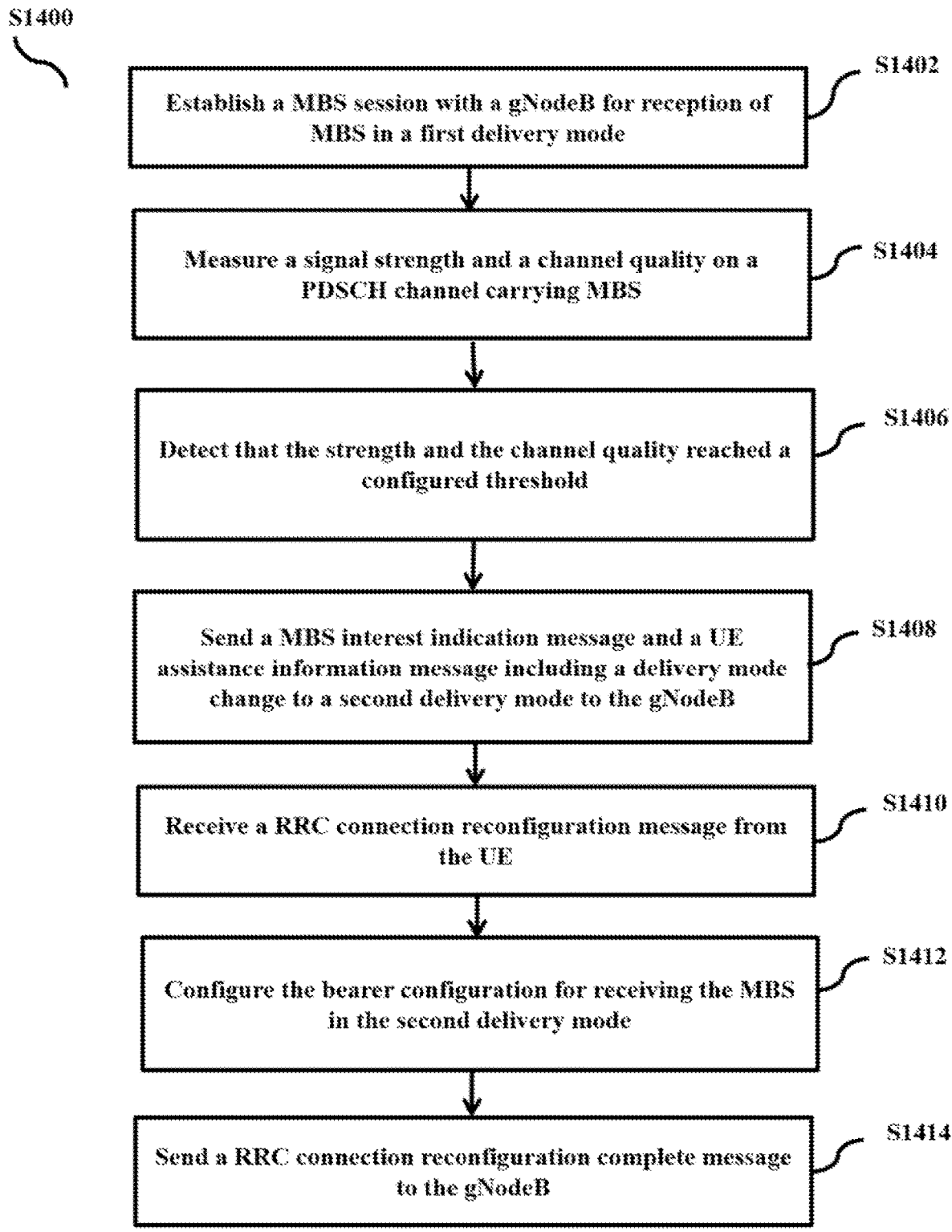
FIG. 14 is a flow chart illustrating a method for MBS switching and continuity in the 5G wireless network, when the UE detects that the signal strength and the channel quality reached a configured threshold, according to an embodiment as disclosed herein.

FIG. 14 is a flow chart (S1400) illustrating a method for MBS switching and continuity in the 5G wireless network (1000), when the UE (100) detects that the signal strength and the channel quality reached a configured threshold, according to an embodiment as disclosed herein. The operations (S1402-S1414) are handled by the MBS switching and continuity controller (140).

At S1402, the method includes establishing the MBS session with a gNodeB (200) for reception of MBS in the first delivery mode. At S1404, the method includes measuring the signal strength and the channel quality on the PDSCH or group-common PDSCH channel carrying the MBS. At S1406, the method includes detecting that the signal strength and the channel quality reached the configured threshold. At S1408, the method includes sending the MBS interest indication message and a UE assistance information message comprising a delivery mode change to a second delivery mode to the gNodeB. At S1410, the method includes receiving the RRC connection reconfiguration message from the UE (100), where the RRC connection reconfiguration message comprising a bearer configuration for receiving the MBS in the second delivery mode. At S1412, the method includes configuring the bearer configuration for receiving the MBS in the second delivery mode. At S1414, the method includes sending the RRC connection reconfiguration complete message to the gNodeB (200).

Figure 15:
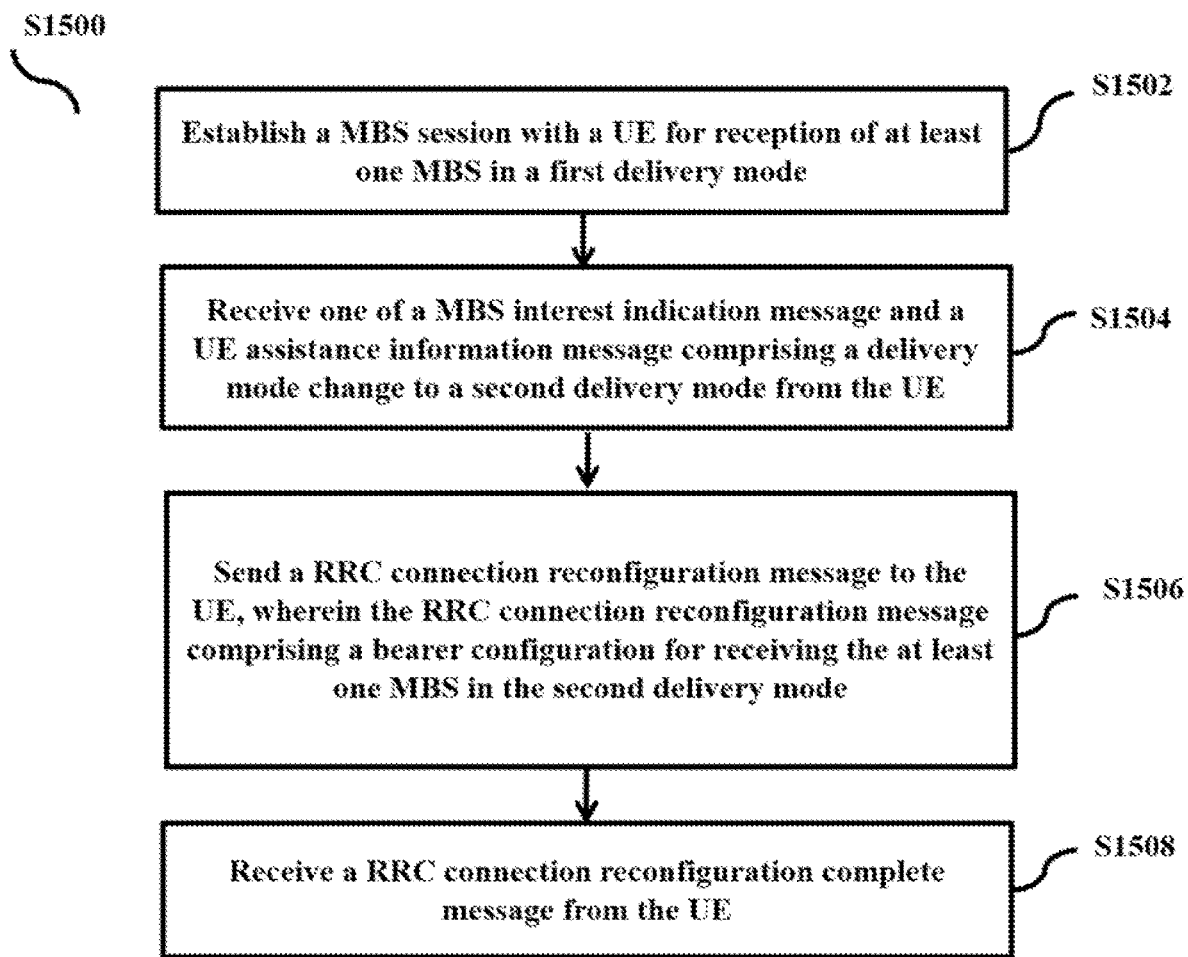
FIG. 15 is a flow chart illustrating a method for MBS switching and continuity in the 5G wireless network, when the gNodeB receives the MBS interest indication message and the UE assistance information message includes a delivery mode change to a second delivery mode from the UE, according to an embodiment as disclosed herein.

FIG. 15 is a flow chart (S1500) illustrating a method for MBS switching and continuity in the 5G wireless network (1000), when the gNodeB (200) receives the MBS interest indication message and the UE assistance information message includes a delivery mode change to a second delivery mode from the UE (100), according to an embodiment as disclosed herein. The operations (S1502-S1508) are handled by the MBS switching and continuity controller (240).

At S1502, the method includes establishing the MBS session with the UE (100) for reception of the MBS in the first delivery mode. At S1504, the method includes receiving the MBS interest indication message and the UE assistance information message includes a delivery mode change to the second delivery mode from the UE (100). At S1605, the method includes sending the RRC connection reconfiguration message to the UE (100). The RRC connection reconfiguration message includes a bearer configuration for receiving the at least one MBS in the second delivery mode. At S1508, the method includes receiving the RRC connection reconfiguration complete message from the UE (100).

Figure 16:
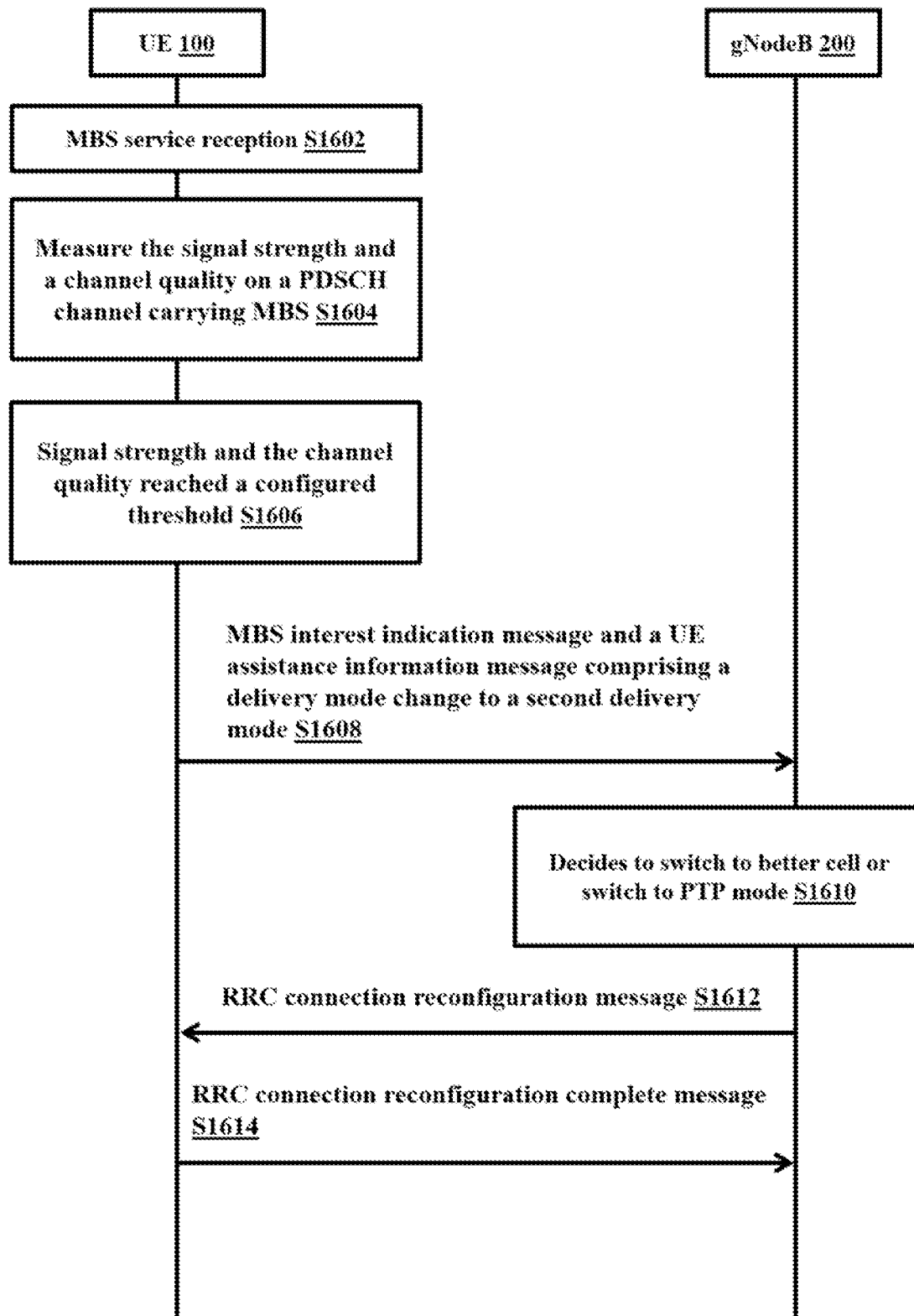
FIG. 16 is an example sequence diagram illustrating step by step operations for MBS switching and continuity in the 5G wireless network, when the UE detects that the signal strength and the channel quality reached a configured threshold, according to an embodiment as disclosed herein.

FIG. 16 is a sequence diagram illustrating step by step operations for MBS switching and continuity in the 5G wireless network (1000), when the UE (100) detects that the signal strength and the channel quality reached a configured threshold, according to an embodiment as disclosed herein.

At S1602, the UE (100) is in the MBS service reception. At S1604, the UE (100) measures the signal strength and a channel quality on the PDSCH or group-common PDSCH channel carrying MB S. At S1606, UE (100) detects that the signal strength and the channel quality reached the configured threshold. At S1608, the UE (100) sends the MBS interest indication message and a UE assistance information message comprising the delivery mode change to the second delivery mode to the gNodeB (200). At S1610, the gNodeB (200) decides to switch to better cell or switch to PTP mode. At S1612, the gNodeB (200) sends the RRC connection reconfiguration message to the UE (100). At S1614, the UE (100) sends the RRC connection reconfiguration complete message to the gNodeB (200).

Figure 17:
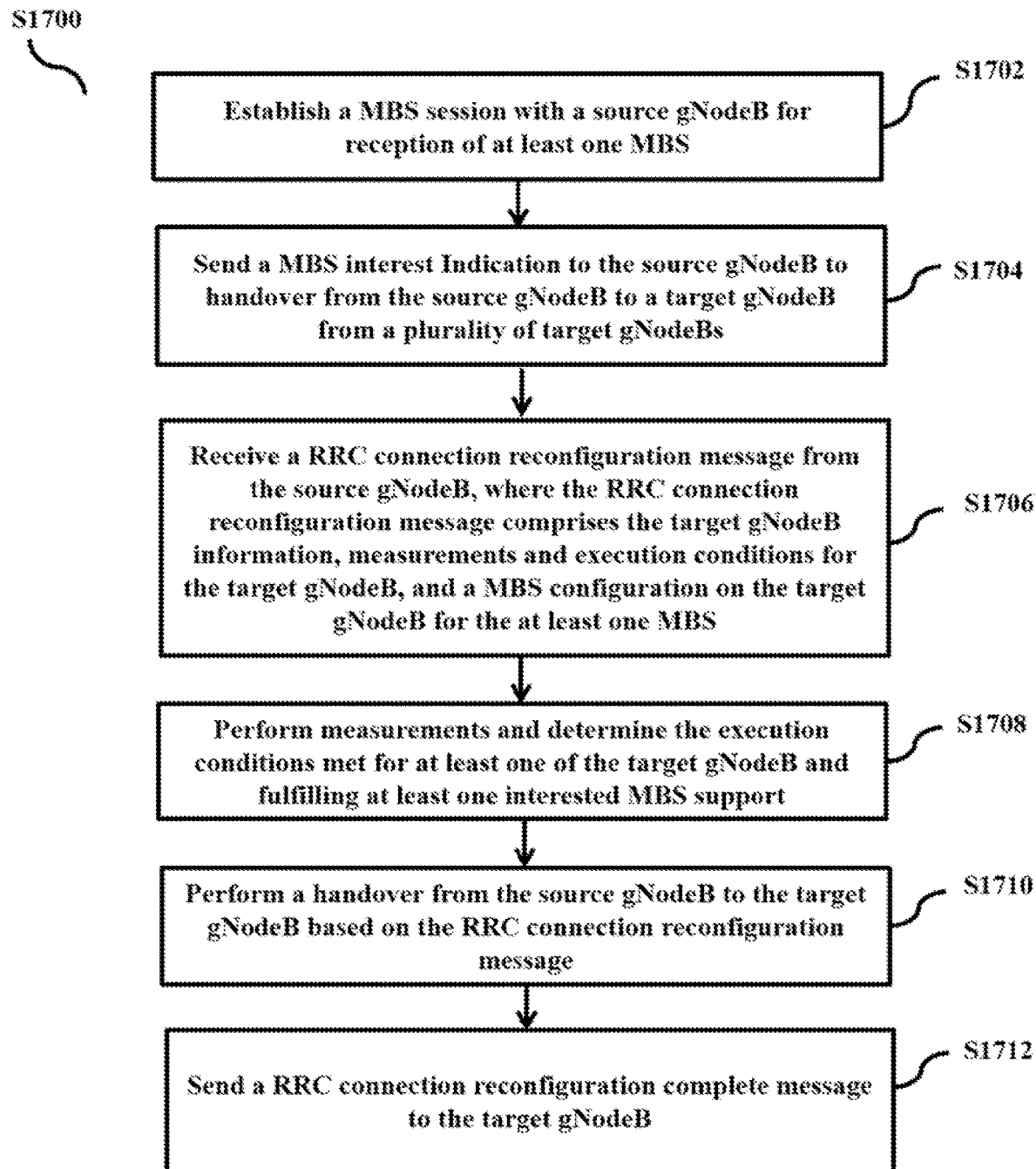
FIG. 17 is a flow chart illustrating a method for MBS switching and continuity in the 5G wireless network during a handover scenario, according to an embodiment as disclosed herein.

FIG. 17 is a flow chart (S1700) illustrating a method for MBS switching and continuity in the 5G wireless network (1000) during a handover scenario, according to an embodiment as disclosed herein. The operations (S1702-S1712) are handled by the MBS switching and continuity controller (140).

At S1702, the method includes establishing the MBS session with the source gNodeB for reception of the MBS. At S1704, the method includes sending the MBS interest Indication to the source gNodeB to handover from the source gNodeB to a target gNodeB from a plurality of target gNodeBs. At S1706, the method includes receiving the RRC connection reconfiguration message from the source gNodeB. The RRC connection reconfiguration message includes the target gNodeB information, measurements and execution conditions for the target gNodeB, and a MBS configuration on the target gNodeB for the at least one MBS. At S1708, the method includes performing the handover from the source gNodeB to the target gNodeB based on the RRC connection reconfiguration message. At S1710, the method includes sending the RRC connection reconfiguration complete message to the target gNodeB.

Figure 18:
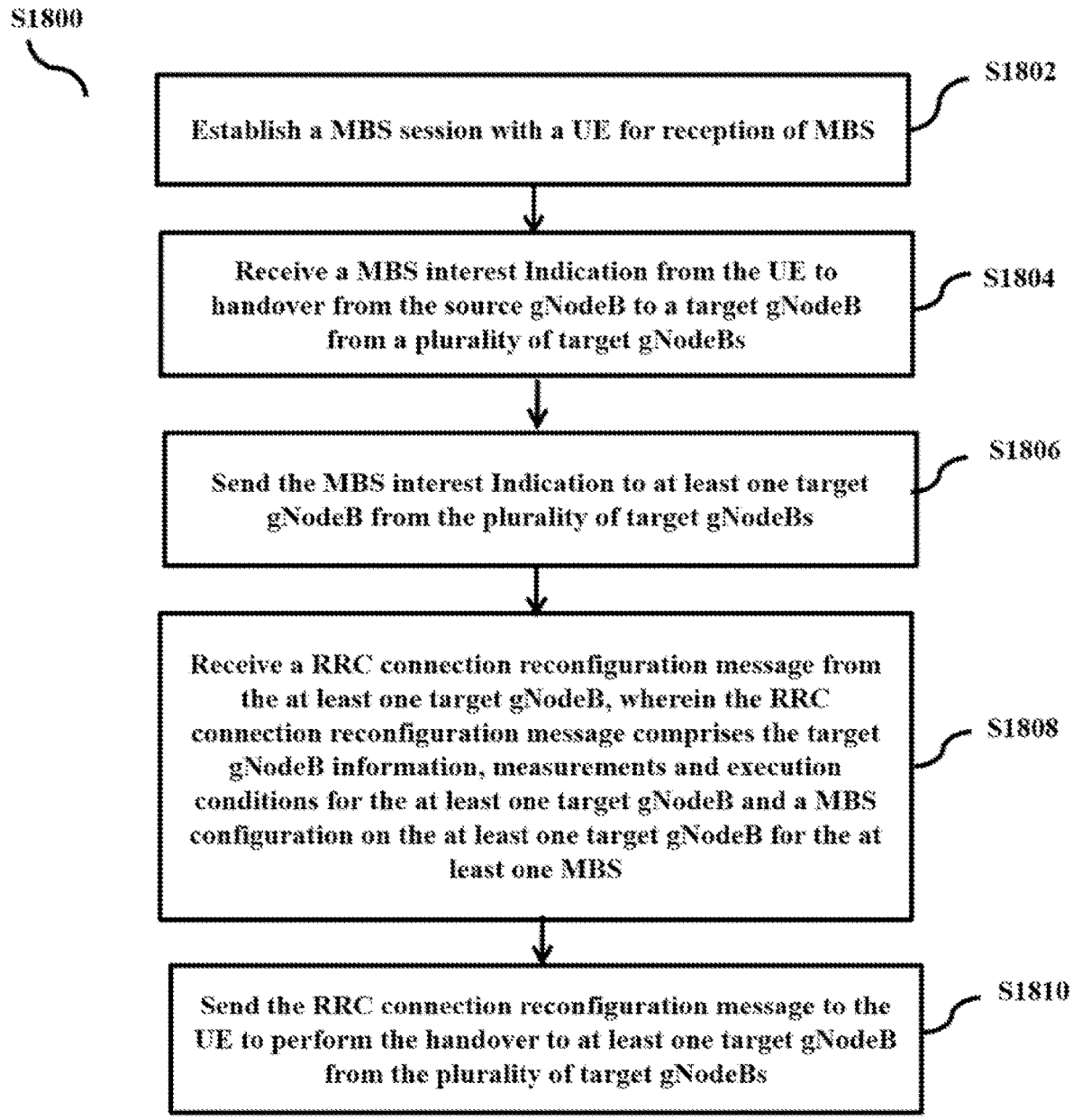
FIG. 18 is a flow chart illustrating a method for the MBS switching and continuity in the 5G wireless network during the handover scenario, according to an embodiment as disclosed herein.

FIG. 18 is a flow chart (S1800) illustrating a method for MBS switching and continuity in the 5G wireless network (1000) during the handover scenario, according to an embodiment as disclosed herein. The operations (S1802-S1810) are handled by the MBS switching and continuity controller (240)

At S1802, the method includes establishing the MBS session with the UE (100) for reception of the MBS. At S1804, the method includes receiving the MBS interest indication from the UE (100) to handover from the source gNodeB to the target gNodeB from the plurality of target gNodeBs. At S1806, the method includes sending the MBS interest indication to the target gNodeB from the plurality of target gNodeBs. At S1808, the method includes receiving a RRC connection reconfiguration message from the target gNodeB. The RRC connection reconfiguration message includes the target gNodeB information, measurements and execution conditions for the target gNodeB and a MBS configuration on the target gNodeB for the at least one MBS including bearer configuration, DRX configuration, G-RNTI, G-CS-RNTI, delivery mode, security context keys and other information. At S1810, the method includes sending the RRC connection reconfiguration message to the UE (100) to perform the handover to the target gNodeB from the plurality of target gNodeBs.

Figure 19:
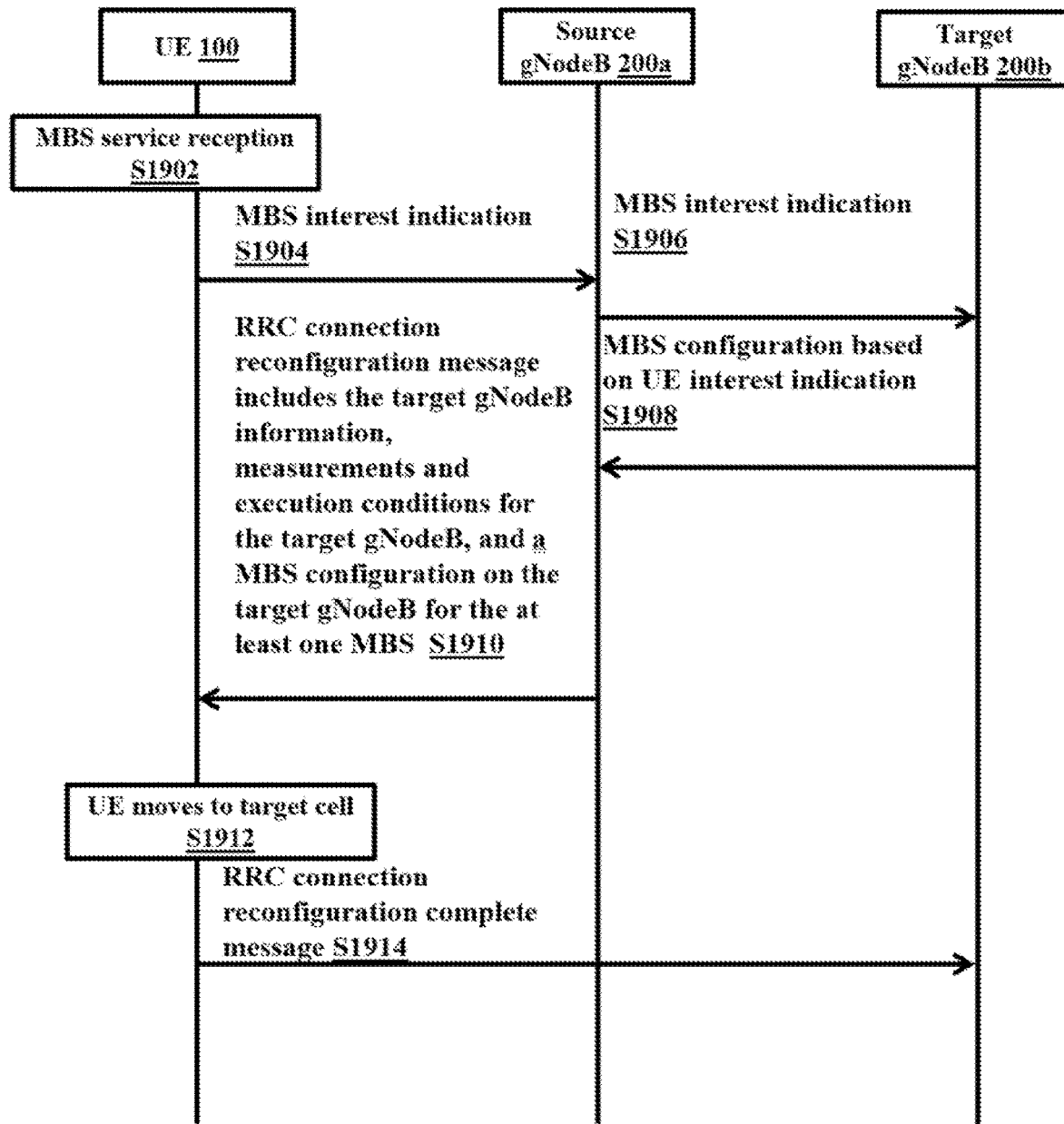
FIG. 19 and FIG. 20 are example sequential flow diagrams illustrating step by step operations for MBS switching and continuity in the 5G wireless network during the handover scenario, according to an embodiment as disclosed herein.
Figure 20:
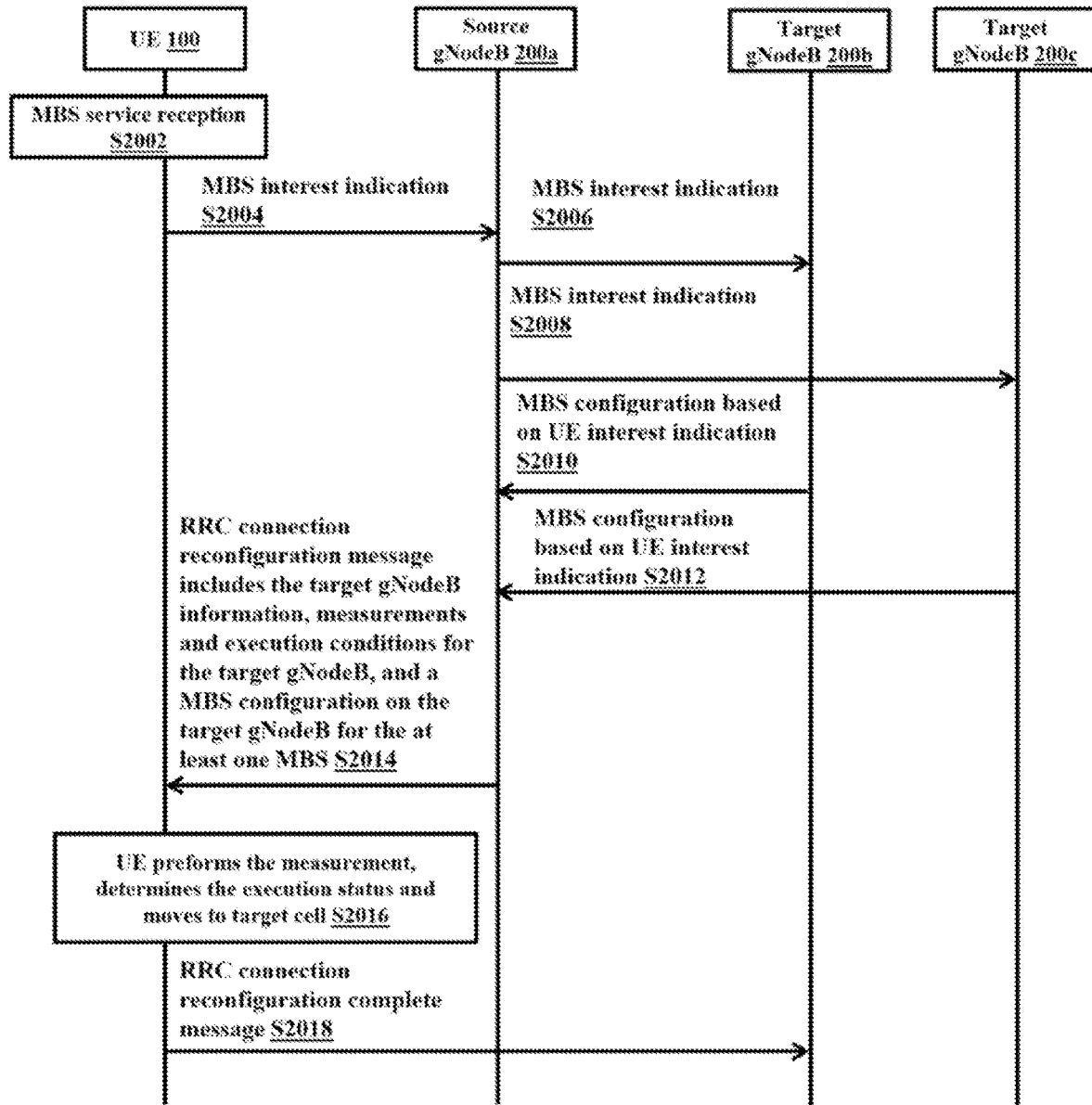

FIG. 19 and FIG. 20 are example sequence diagram illustrating step by step operations for MBS switching and continuity in the 5G wireless network (1000) during the handover scenario, according to an embodiment as disclosed herein.

As shown in the FIG. 19, at S1902, the UE (100) is in the MBS service reception. At S1904, the UE (100) sends the MBS interest indication to the source gNodeB (200a). At S1906, the source gNodeB (200a) sends the MBS interest indication to the target gNodeB (200b). At S1908, the target gNodeB (200b) sends the MBS configuration based on UE interest indication to the source gNodeB (200a). At S1910, the source gNodeB (200a) sends the RRC connection reconfiguration message including the target gNodeB information, measurements and execution conditions for the target gNodeB (200b), and a MBS configuration on the target gNodeB (200b) for the MBS to the UE (100) including bearer configuration, DRX configuration, G-RNTI, G-CS-RNTI, delivery mode, security context keys and other information. Based on the RRC connection reconfiguration message, at S1912, the UE (100) moves to the target cell. At S1914, the UE (100) sends the RRC connection reconfiguration complete message to the target gNodeB (200b).

As shown in the FIG. 20, at S2002, the UE (100) is in the MBS service reception. At 2004, the UE (100) sends the MBS interest indication to the source gNodeB (200a). At S2006, the source gNodeB (200a) sends the MBS interest indication to the target gNodeB (200b). At S2008, the source gNodeB (200a) sends the MBS interest indication to the target gNodeB (200c). At S2010, the target gNodeB (200b) sends the MBS configuration based on UE interest indication to the source gNodeB (200a). At S2012, the target gNodeB (200c) sends the MBS configuration based on the UE interest indication to the source gNodeB (200a). At S2014, the source gNodeB (200a) sends the RRC connection reconfiguration message including the target gNodeB information, measurements and execution conditions for the target gNodeB (200b), and a MBS configuration on the target gNodeB (200b) for the MBS to the UE (100) including bearer configuration, DRX configuration, G-RNTI, G-CS-RNTI, delivery mode, security context keys and other information. Based on the RRC connection reconfiguration message, at S2016, the UE (100) moves to the target cell by performing the measurement and determining the execution status. At S2018, the UE (100) sends the RRC connection reconfiguration complete message to the target gNodeB (200b).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for Multicast and Broadcast Service (MBS) switching and continuity in a 5th Generation (5G) wireless network, wherein the method comprises:
    establishing, by a gNodeB, a MBS session with a user equipment (UE);
    providing, by the gNodeB, at least one MBS to the UE during the MBS session;
    detecting, by the gNodeB, that the at least one MBS is going to get suspended or deactivated based on signal strength and channel quality reaching a configured threshold; and
    sending, by the gNodeB, an indication to the UE indicating the at least one MBS going to get suspended or deactivated prior to suspension or deactivation of the at least one MBS at the UE,
    wherein signal strength and channel quality are measured on a Physical Downlink Shared Channel (PDSCH) carrying MBS, and
    wherein the channel quality is determined by a channel quality indicator (CQI) parameter that is periodically measured by the UE and provided by the UE to the 5G wireless network.

2. The method as claimed in claim 1, wherein the indication is at least one of a Media Access Control (MAC) control element (CE), a radio resource control (RRC) signaling, and a Downlink control information (DCI).

3. The method as claimed in claim 2, wherein the MAC CE comprises at least one of a Group Radio Network Temporary Identifier (G-RNTI) or a Group-Configured Scheduling-Radio Network Identifier (G-CS-RNTI), a Logical Channel ID (LCID) information, identifier of the MBS session and a Temporary Mobile Group Identifier (TMGI).

4. The method as claimed in claim 1, wherein the method comprises:
    detecting, by the gNodeB, that the at least one MBS is received using a first delivery mode;
    sending, by the gNodeB, a Radio Resource Control (RRC) connection reconfiguration message comprising a bearer configuration for a second delivery mode to the UE to switch from the first delivery mode to the second delivery mode for reception of the at least one MBS; and receiving by the gNodeB, a RRC reconfiguration complete message from the UE.

5. The method as claimed in claim 4, wherein the bearer configuration is one of a point-to-point (PTP) bearer configuration, a point-to-multipoint (PTM) bearer configuration and a split MBS bearer configuration.

6. The method as claimed in claim 4, wherein the RRC connection reconfiguration message comprises a timer or a time period to switch from the first delivery mode to the second delivery mode for reception of the at least one MBS.

7. A method for Multicast and Broadcast Service (MBS) switching and continuity in a 5th Generation (5G) wireless network, wherein the method comprises:
- establishing, by a User Equipment (UE), a MBS session with a gNodeB;
- receiving, by the UE, the at least one MBS from the gNodeB during the MBS session using a first delivery mode;
- receiving, by the UE, an indication from the gNodeB indicating that the at least one MBS going to get suspended or deactivated, based on signal strength and channel quality reaching a configured threshold, prior to suspension or deactivation of the at least one MBS at the UE; and
- switching, by the UE, from the first delivery mode to a second delivery mode to continue reception of the at least one MBS based on a Media Access Control (MAC) control element (CE) prior to suspension or deactivation of the at least one MBS at the UE,
- wherein signal strength and channel quality are measured on a Physical Downlink Shared Channel (PDSCH) carrying MBS, and
- wherein the channel quality is determined by a channel quality indicator (CQI) parameter that is periodically measured by the UE and provided by the UE to the 5G wireless network.

8. The method as claimed in claim 7, wherein the MAC CE comprises at least one of a Group Radio Network Temporary Identifier (G-RNTI) or a Group-Configured Scheduling-Radio Network identifier (G-CS-RNTI), a Logical Channel ID (LCID) information, identifier of the MBS session and a Temporary Mobile Group Identifier (TMGI).

9. The method as claimed in claim 7, wherein the indication is at least one of a MAC control element (CE), a Radio Resource Control (RRC) signaling, and a Downlink control information (DCI).

10. The method as claimed in claim 7, wherein switching, by the UE, from the first delivery mode to the second delivery mode to continue reception of the at least one MBS based on the MAC CE comprises:
- receiving, by the UE, a Radio Resource Control (RRC) connection reconfiguration message comprising a bearer configuration for the second delivery mode from the gNodeB;
- switching, by the UE, from the first delivery mode to the second delivery mode by duplicating reception in the first delivery mode and the second delivery mode for a time period or a timer based on the bearer configuration; and
- sending by the UE, a RRC reconfiguration complete message to the gNodeB.

11. The method as claimed in claim 10, wherein the bearer configuration is one of a point-to-point (PTP) bearer configuration, a point-to-multipoint (PTM) bearer configuration and a split MBS bearer configuration.

12. The method as claimed in claim 10, wherein the time period or the timer is configured by the gNodeB, or wherein the time period or the timer is locally set by the UE.

13. A gNodeB for Multicast and Broadcast Service (MBS) switching and continuity in a 5th Generation (5G) wireless network, wherein the gNodeB comprises:
- a memory;
- a processor; and
- a MBS switching and continuity controller, communicatively coupled to the memory and the processor configured to:
  - establish a MBS session with a user equipment (UE);
  - provide at least one MBS to the UE during the MBS session;
  - detect that the at least one MBS is going to get suspended or deactivated based on signal strength and channel quality reaching a configured threshold; and
  - send an indication to the UE indicating the at least one MBS going to get suspended or deactivated prior to suspension or deactivation of the at least one MBS at the UE,
- wherein signal strength and channel quality are measured on a Physical Downlink Shared Channel (PDSCH) carrying MBS, and
- wherein the channel quality is determined by a channel quality indicator (CQI) parameter that is periodically measured by the UE and provided by the UE to the 5G wireless network.

14. The gNodeB as claimed in claim 13, wherein the indication is at least one of a Media Access Control (MAC) control element (CE), a Radio Resource Control (RRC) signaling, and a Downlink control information (DCI).

15. The gNodeB as claimed in claim 14, wherein the MAC CE comprises at least one of a Group Radio Network Temporary Identifier (G-RNTI) or a Group-Configured Scheduling-Radio Network Identifier (G-CS-RNTI), a Logical Channel ID (LCID) information, identifier of the MBS session and a Temporary Mobile Group Identifier (TMGI).

16. The gNodeB as claimed in claim 13, wherein the MBS switching and continuity controller is configured to:
- detect that the at least one MBS is received using a first delivery mode;
- send a Radio Resource Control (RRC) connection reconfiguration message comprising a bearer configuration for a second delivery mode to the UE to switch from the first delivery mode to the second delivery mode for reception of the at least one MBS; and
- receive a RRC reconfiguration complete message from the UE.

17. The gNodeB as claimed in claim 16, wherein the bearer configuration is one of a point-to-point (PTP) bearer configuration, a point-to-multipoint (PTM) bearer configuration and a split MBS bearer configuration.

18. The gNodeB as claimed in claim 16, wherein the RRC connection reconfiguration message comprises a timer or a time period to switch from the first delivery mode to the second delivery mode for reception of the at least one MBS.

* * * * *